US008982194B2

(12) United States Patent
Mori et al.

(10) Patent No.: US 8,982,194 B2
(45) Date of Patent: Mar. 17, 2015

(54) IMAGE WATCHING GLASSES IDENTIFICATION DEVICE, IMAGE WATCHING SYSTEM, PAIR OF IMAGE WATCHING GLASSES, IMAGE WATCHING GLASSES IDENTIFICATION PROGRAM, COMPUTER-READABLE RECORDING MEDIUM, AND DISPLAY DEVICE

(75) Inventors: Go Mori, Osaka (JP); Teruhisa Kotani, Osaka (JP); Hideharu Tajima, Osaka (JP); Shigemi Maeda, Osaka (JP); Tetsuya Okumura, Osaka (JP); Takashi Arimoto, Osaka (JP); Toshihiko Sakai, Osaka (JP); Takanobu Sato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 921 days.

(21) Appl. No.: 13/044,270

(22) Filed: Mar. 9, 2011

(65) Prior Publication Data

US 2011/0285829 A1 Nov. 24, 2011

(30) Foreign Application Priority Data

May 20, 2010 (JP) .................................. 2010/116206

(51) Int. Cl.
*H04N 9/47* (2006.01)
*H04N 13/04* (2006.01)
*G02B 27/22* (2006.01)
*H04N 13/00* (2006.01)

(52) U.S. Cl.
CPC ........ *H04N 13/0438* (2013.01); *G02B 27/2264* (2013.01); *H04N 13/0062* (2013.01); *H04N 13/0452* (2013.01); *H04N 13/0497* (2013.01)
USPC .......................................................... 348/53

(58) Field of Classification Search
CPC ..... H04N 7/18; H04N 13/00; H04N 13/0497; H04N 13/0429
USPC .................................. 348/42, 53, 54; 351/41
See application file for complete search history.

(56) References Cited

U.S. PATENT DOCUMENTS

| 2006/0023158 | A1* | 2/2006 | Howell et al. ................... 351/41 |
| 2007/0266412 | A1 | 11/2007 | Trowbridge et al. |
| 2010/0079585 | A1* | 4/2010 | Nemeth et al. .................. 348/54 |

FOREIGN PATENT DOCUMENTS

| CN | 101543085 A | 9/2009 |
| JP | 62-174793 A | 7/1987 |
| JP | 7-222087 A | 8/1995 |

(Continued)

*Primary Examiner* — Allen Wong
(74) *Attorney, Agent, or Firm* — Keating & Bennett, LLP

(57) ABSTRACT

An image watching glasses identification device 10 (or 20 or 30) is an image watching glasses identification device 10 (or 20 or 30) for identifying a pair of shutter glasses 400 through which to watch an image displayed on a display device 100, the image watching glasses identification device 10 (or 20 or 30) including: an identification information obtaining section 15 for obtaining an identification information item for identifying the pair of shutter glasses 400 and; a display control section 12 for causing the display device 100 to display an identification result associated with the identification information item obtained by the identification information obtaining section 15. This makes it possible to provide an image watching glasses identification device that is capable of causing, when a viewer watches through the pair of image watching glasses 400 the image displayed on the display device 100, the display device 100 to display the identification result. The identification result enables the viewer to identify the pair of image watching glasses worn by the viewer.

1 Claim, 14 Drawing Sheets

(56) References Cited

FOREIGN PATENT DOCUMENTS

| | | | |
|---|---|---|---|
| JP | 10-240212 A | 9/1998 |
| JP | 11-075223 A | 3/1999 |
| JP | 2006-186768 A | 7/2006 |
| JP | 2006-196995 A | 7/2006 |

\* cited by examiner

| Image A | N | Y | N | Y | N | Y | N | Y |
|---|---|---|---|---|---|---|---|---|
| Image B | Y | N | Y | N | Y | N | Y | N |

(b)

| Shutter glasses 400A Right | N | Y | N | Y | N | Y | N | Y |
|---|---|---|---|---|---|---|---|---|
| Shutter glasses 400A Left | Y | N | Y | N | Y | N | Y | N |

(c)

| Shutter glasses 400B Right | Y | N | Y | N | Y | N | Y | N |
|---|---|---|---|---|---|---|---|---|
| Shutter glasses 400B Left | Y | N | Y | N | Y | N | Y | N |

| | 1 | 2 | 3 | 4 | 5 | 6 | 7 | 8 |
|---|---|---|---|---|---|---|---|---|
| Image A | Y | N | N | N | N | N | Y | N |
| Image B | N | Y | N | N | N | N | N | N |
| Image C | N | N | Y | N | N | Y | N | N |
| Image D | N | N | N | Y | Y | N | N | Y |
| Shutter glasses 400A Right | Y | N | N | N | N | N | Y | N |
| Shutter glasses 400A Left | N | Y | N | N | N | N | N | N |
| Shutter glasses 400B Right | N | N | Y | N | N | Y | N | N |
| Shutter glasses 400B Left | N | N | N | Y | Y | N | N | Y |

(b)

| | 1 | 2 | 3 | 4 | 5 | 6 | 7 | 8 |
|---|---|---|---|---|---|---|---|---|
| Image A | Y | N | N | Y | N | N | N | N |
| Image B | N | Y | N | N | Y | N | N | N |
| Image C | N | N | Y | N | N | N | Y | N |
| Image D | N | N | N | N | N | Y | N | Y |
| Shutter glasses 400A Right | N | N | Y | N | N | N | Y | N |
| Shutter glasses 400A Left | N | N | N | N | Y | N | N | Y |
| Shutter glasses 400B Right | Y | N | N | Y | N | N | N | N |
| Shutter glasses 400B Left | N | Y | N | N | N | Y | N | N | ions # IMAGE WATCHING GLASSES IDENTIFICATION DEVICE, IMAGE WATCHING SYSTEM, PAIR OF IMAGE WATCHING GLASSES, IMAGE WATCHING GLASSES IDENTIFICATION PROGRAM, COMPUTER-READABLE RECORDING MEDIUM, AND DISPLAY DEVICE This Nonprovisional application claims priority under 35 U.S.C. §119(a) on Patent Application No. 2010-116206 filed in Japan on May 20, 2010, the entire contents of which are hereby incorporated by reference.

TECHNICAL FIELD

The present invention relates to an image watching glasses identification device, an image watching system, a pair of image watching glasses, an image watching glasses identification program, a computer-readable recording medium, and a display device, each of which is capable of causing, when a viewer watches through the pair of image watching glasses an image displayed on the display device, the display device to display an identification result for identifying the pair of image watching glasses.

BACKGROUND ART

In recent years, research and development for an image watching method etc. have been carried out not only for a two-dimensional image but also for a three-dimensional image.

For example, Patent Literature 1 describes a stereoscopic watching method. According to the stereoscopic watching method, an image is given a three-dimensional appearance in such a manner that (i) two-dimensional data for a left eye and two-dimensional data for a right eye are displayed time-divisionally on an identical display screen and (ii) left and right lenses of a pair of glasses having opening and closing functions, which glasses are worn by a viewer, are opened and closed in synchronization with displaying of the two-dimensional data for the left eye and of the two-dimensional data for the right eye.

Patent Literature 2 describes a multi-image system. According to the multi-image system, (i) images of different kinds are displayed on an identical display screen, and (ii) each of a plurality of viewers in an identical room can watch a corresponding one of the images of different kinds.

Patent Literature 3 describes an image display device. According to the image display device, a plurality of images are displayed on an identical display screen without reducing a display size of each of the plurality of images, and thereby a plurality of viewers simultaneously watch the plurality of images.

CITATION LIST

Patent Literatures

Patent Literature 1
Japanese Patent Application Publication, Tokukaisho, No. 62-174793 A (Publication Date: Jul. 31, 1987)
Patent Literature 2
Japanese Patent Application Publication, Tokukaihei, No. 7-222087 A (Publication Date: Aug. 18, 1995)
Patent Literature 3
Japanese Patent Application Publication, Tokukaihei, No. 10-240212 A (Publication Date: Sep. 11, 1998)

SUMMARY OF INVENTION

Technical Problem

Note, however, that the techniques described in the foregoing Patent Literatures each cause the following problem. The following description is based on the assumption that each of a plurality of viewers wears a pair of image watching glasses and watches a desired image on an identical display device.

In this case, the desired image and an unwanted image(s) are to be sequentially displayed on the identical display device. Note, however, that each of the plurality of viewers cannot know to which image the pair of image watching glasses worn by the each of the plurality of viewers corresponds. Therefore, each of the plurality of viewers may not be able to watch the desired image through a certain pair of image watching glasses. Further, since each of the plurality of viewers cannot identify the pair of image watching glasses worn by the each of the plurality of viewers, it is not possible to achieve an evolutionary watching method in which the each of the plurality of viewers identifies a specified pair of image watching glasses and thus can change settings of an image to which the specified pair of image watching glasses corresponds. That is, in order to achieve such an evolutionary watching method, it is necessary to cause each of the plurality of viewers to accurately recognize an identification result, which enables the each of the plurality of viewers to identify the pair of image watching glasses worn by the each of the plurality of viewers.

In this regard, with any of the techniques described in the foregoing Patent Literatures, it is not possible to cause each of the plurality of viewers to recognize the identification result, which enables the each of the plurality of viewers to identify the pair of image watching glasses worn by the each of the plurality of viewers. That is, none of the techniques described in the foregoing Patent Literatures provide a technique that is necessary for achieving the foregoing evolutionary watching method.

Specifically, according to Patent Literature 1, the number of kinds of the image viewed with both eyes of the viewer is one (1). Therefore, the viewer does not at all need to identify a pair of image watching glasses worn by the viewer.

According to Patent Literatures 2 and 3, each of the plurality of viewers cannot know to which image the pair of image watching glasses worn by the each of the plurality of viewers corresponds. Therefore, the each of the plurality of viewers may not be able to watch the desired image through a certain pair of image watching glasses. Since each of the plurality of viewers cannot know to which image the pair of image watching glasses worn by the each of the plurality of viewers corresponds, it is not possible to achieve an evolutionary watching method in which the each of the plurality of viewers identifies a specified pair of image watching glasses and thus can change settings of the image to which the specified pair of image watching glasses corresponds.

The present invention has been made in view of the problem, and an object of the present invention is to provide an image watching glasses identification device, an image watching system, a pair of image watching glasses, an image watching glasses identification program, a computer-readable recording medium, and a display device, each of which is capable of causing, when a viewer watches through the pair of image watching glasses an image displayed on the display device, the display device to display an identification result for identifying the pair of image watching glasses.

Solution to Problem

In order to attain the above object, an image watching glasses identification device in accordance with the present invention is an image watching glasses identification device for identifying a pair of image watching glasses through which to watch an image displayed on a display device, the image watching glasses identification device including: identification information obtaining means for obtaining an identification information item for identifying the pair of image watching glasses; and display controlling means for causing the display device to display an identification result associated with the identification information item obtained by the identification information obtaining means.

In order to attain the above object, an image watching system in accordance with the present invention includes: a display device; and a pair of image watching glasses through which to watch an image displayed on the display device, said image watching system, further including: an image watching glasses identification device including: identification information obtaining means for obtaining an identification information item for identifying the pair of image watching glasses; and display controlling means for causing the display device to display an identification result associated with the identification information item obtained by the identification information obtaining means.

In order to attain the above object, a pair of image watching glasses in accordance with the present invention is a pair of image watching glasses for use in an image watching system that includes: a display device; and the pair of image watching glasses through which to watch an image displayed on the display device, said image watching system, further including: an image watching glasses identification device including: identification information obtaining means for obtaining an identification information item for identifying the pair of image watching glasses; and display controlling means for causing the display device to display an identification result associated with the identification information item obtained by the identification information obtaining means, the identification result indicating that a viewer uses the pair of image watching glasses.

In recent years, research and development for an image watching method etc. have been carried out not only for a two-dimensional image but also for a three-dimensional image. According to one example of such a watching method, a plurality of viewers are wearing respective pairs of image watching glasses, and each of the plurality of viewers watches a desired one of images displayed on an identical display device.

Note however that, in a case where (i) the desired image and an unwanted image(s) are sequentially displayed on the identical display device and (ii) only the desired image is to be watched through a pair of image watching glasses operating in synchronization with the image display, each of the plurality of viewers cannot know to which image a pair of image watching glasses worn by the each of the plurality of viewers corresponds. Therefore, each of the plurality of viewers may not be able to watch the desired image through a certain pair of image watching glasses. Further, since each of the plurality of viewers cannot identify the pair of image watching glasses worn by the each of the plurality of viewers, it is not possible to achieve an evolutionary watching method in which the each of the plurality of viewers identifies a specified pair of image watching glasses and thus can change settings of an image to which the specified pair of image watching glasses corresponds.

Under such circumstances, in order to achieve the foregoing evolutionary watching method, it is very necessary to cause each of the plurality of viewers to recognize the identification result for identifying the pair of image watching glasses worn by the each of the plurality of viewers. In this regard, according to the present invention, the identification information obtaining means obtains the identification information item (e.g., an information item of "Glasses 1") for identifying the pair of the image watching glasses. Then, the display controlling means causes the display device to display the identification result (e.g., an information item of "You are using Glasses 1") associated with the identification information item of "Glasses 1". This enables each of the plurality of viewers to recognize the identification result displayed on the display device, and thus recognize that the pair of image watching glasses worn by the each of the plurality of viewers is the specified pair of image watching glasses (e.g., Grasses 1).

In this way, each of the plurality of viewers can identify the pair of image watching glasses worn by the each of the plurality of viewers. Accordingly, it is possible also to achieve an evolutionary watching method in which each of the plurality of viewers identifies the pair of image watching glasses worn by the each of the plurality of viewers and thus can change the settings of the image that the pair of image watching glasses corresponds.

Further, the present invention encompasses an image watching system including: a display device; a pair of image watching glasses through which to watch an image displayed on the display device; and the image watching glasses identification device. Furthermore, the present invention encompasses a pair of image watching glasses for use in the image watching system.

Note that the "image" means an image displayed on the display device. The image is for example a moving image, a still image (e.g., a character [Japanese character or character of any other language, symbol, numeric character, or the like], a drawing, a photograph, or a figure), or the like.

Advantageous Effects of Invention

As described above, the image watching glasses identification device in accordance with the present invention is configured so as to include: identification information obtaining means for obtaining an identification information item for identifying the pair of image watching glasses; and display controlling means for causing the display device to display an identification result associated with the identification information item obtained by the identification information obtaining means.

The image watching system in accordance with the present invention is configured so as to include: an image watching glasses identification device including: identification information obtaining means for obtaining an identification information item for identifying the pair of image watching glasses; and display controlling means for causing the display device to display an identification result associated with the identification information item obtained by the identification information obtaining means.

As described above, the image watching system in accordance with the present invention is configured so as to include: a display device; and a pair of image watching glasses through which to watch an image displayed on the display device, said image watching system, further including: an image watching glasses identification device including: identification information obtaining means for obtaining an identification information item for identifying the pair of image watching glasses; and display controlling means for causing the display device to display an identification result associated with the identification information item obtained by the identification information obtaining means.

As described above, the pair of image watching glasses in accordance with the present invention is configured so as to be used in an image watching system that includes: a display device; and the pair of image watching glasses through which to watch an image displayed on the display device, said image watching system, further including: an image watching glasses identification device including: identification information obtaining means for obtaining an identification information item for identifying the pair of image watching glasses; and display controlling means for causing the display device to display an identification result associated with the identification information item obtained by the identification information obtaining means, the identification result indicating that a viewer uses the pair of image watching glasses.

This achieves an advantageous effect in which it is possible to provide an image watching glasses identification device etc. each of which is capable of causing, when a viewer watches through a pair of image watching glasses an image displayed on the display device, a display device to display an identification result for identifying the pair of image watching glasses.

BRIEF DESCRIPTION OF DRAWINGS

FIG. 4 illustrates how a synchronization control section and shutter glasses operate. (a) of FIG. 4 is a view illustrating timings at which an image A and an image B are displayed on a display device. (b) of FIG. 4 is a view illustrating timings at which shutters of a pair of shutter glasses (400A) are opened and closed. (c) of FIG. 4 is a view illustrating timings at which shutters of a pair of shutter glasses (400B) are opened and closed.

FIG. 13 is a view illustrating how (i) timings at which images A through D are displayed on the display device and (ii) timings at which a shutter for a right eye and a shutter for a left eye of each of a pair of shutter glasses (400A) and a pair of shutter glasses (400B) are opened and closed are synchronized with each other. (a) of FIG. 13 illustrates synchronization obtained before players are switched. (b) of FIG. 13 illustrates synchronization obtained after the players are switched.

DESCRIPTION OF EMBODIMENTS

The following description describes, with reference to the drawings, an image watching glasses identification device etc. in accordance with the present invention. In the following description, each of (i) identical members and (ii) identical constituents are assigned identical referential numerals, and have identical names and functions. Therefore, each of the identical members and the identical constituents is not described in detail twice.

[Schematic Configuration of Image Watching System 1]

Figure 2:
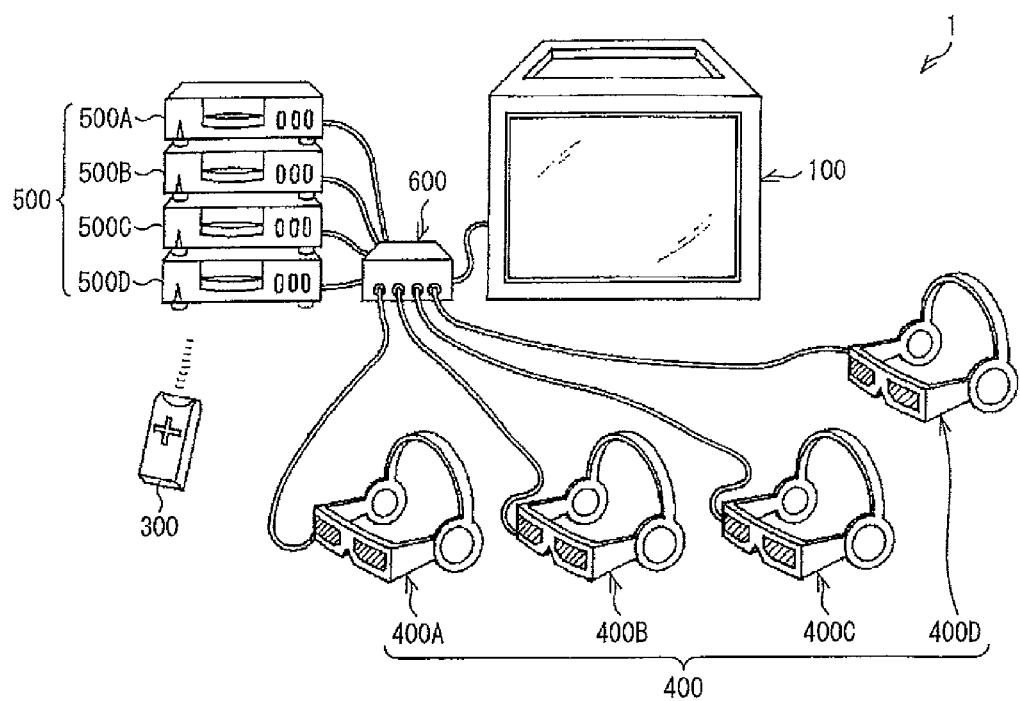
FIG. 2 is a view schematically illustrating how an image watching system in accordance with the present invention is configured.

The following description discusses, with reference to FIG. 2, an image watching system 1 of the present embodiment. FIG. 2 is a view schematically illustrating how the image watching system 1 is configured.

The image watching system 1 is a system in which a viewer, who is wearing a pair of shutter glasses (image watching glasses) 400, watches an image that is reproduced by a record reproduction device 500 and displayed on a display device 100. The image watching system 1 includes, as main constituents, the display device 100, an operation section 300, the shutter glasses 400, the record reproduction device 500, and a transponder 600.

The display device 100 is a device on which the image reproduced by the record reproduction device 500 is displayed, and is for example an LCD (liquid crystal display), a PDP (plasma display panel), a CRT (cathode-ray tube) display, or the like. Note here that the display device 100 includes an image watching glasses identification device 10 (not illustrated).

The operation section 300 is a section via which the viewer inputs an instruction signal, which causes the display device 100 (or the image watching glasses identification device 10 included in the display device 100) and the record reproduction device 500 to operate. The operation section 300 can be constituted by for example: a remote controller for controlling the display device 100 at a distance; a manual operation button provided directly on the display device 100; a mouse and/or a keyboard connected with the display device 100; or the like. The instruction signal inputted by the viewer via the operation section 300 is sent, via an input-output control section (not illustrated), to the display device 100 and/or the record reproduction device 500. In this way, the viewer can operate the display device 100 and the record reproduction device 500.

Note here that, although FIG. 2 illustrates only one operation section 300, a plurality of operation sections 300 can be provided for the image watching glasses identification device 10, the display device 100, and the record reproduction device 500, respectively.

The pair of the shutter glasses 400 includes for example liquid crystal shutters, each of which has a trilaminar structure constituted by a polarizing plate, a liquid crystal filter, and another polarizing plate. According to the pair of the shutter glasses 400, the liquid crystal filter allows for switching between two different states where orientations of light polarization are different from each other. More specifically, the pair of the shutter glasses 400 opens and closes a shutter for a right eye and a shutter for a left eye in accordance with a shutter drive signal which controls transmission and blocking of light. The shutter drive signal is in synchronization with a field frequency of a target image signal outputted from the display device 100, and a signal width of the shutter drive signal corresponds to the target image signal. Since the shutters of the pair of the shutter glasses 400 operate in accordance with the shutter drive signal, the shutters are opened while an "image corresponding to the target image signal among a plurality of image signals" is being displayed and closed while an image other than the "image corresponding to the target image signal among a plurality of image signals" is being displayed. Thereby, the viewer can see only the "image corresponding to the target image signal among a plurality of image signals" which is selected by the viewer, and cannot see the image other than the "image corresponding to the target image signal among a plurality of image signals". Accordingly, the viewer can watch only a desired image through the pair of the shutter glasses 400.

According to FIG. 2, the shutter glasses 400 are connected, by wires, with the display device 100 via the transponder 600. Note, however, that the shutter glasses 400 can be connected with the transponder 600 and/or the display device 100 without the wires.

Further, according to FIG. 2, four pairs of the shutter glasses 400, i.e., a pair of shutter glasses 400A, a pair of shutter glasses 400B, a pair of shutter glasses 400C, and a pair of shutter glasses 400D, are connected with the transponder 600. Note, however, that the number of pairs of the shutter glasses 400 is not limited to four, and therefore can be any number other than four.

The record reproduction device 500 reproduces image information recorded on an information recording medium such as a BD (Blu-ray Disc), a DVD (Digital Versatile Disc), an HDD (Hard Disc Drive), or the like. The record reproduction device 500 can be a commonly-known record reproduction device.

FIG. 2 is based on the assumption that an image displayed on the display device 100 is the one reproduced by the record reproduction device 500. Note, however, that the image displayed on the display device 100 can be an image corresponding to image data provided by (i) a content distribution service which provides content such as a movie or the like or by (ii) real-time broadcasting over the IP (Internet Protocol) network. For example, the image displayed on the display device 100 can be an image corresponding to image data obtained from linear TV, which is a kind of TV broadcasting that provides programs in real time according to a predetermined schedule. Alternatively, the image displayed on the display device 100 can be an image corresponding to image data obtained from VoD (Video on Demand), which provides content in a unicast transmission to a content processor in response to a distribution request from the content processor.

Further, an image displayed on the display device 100 can either be (i) a two-dimensional image or (ii) a three-dimensional image including an image for a right eye and an image for a left eye.

The transponder 600 connects the record reproduction device 500, the shutter glasses 400, and the display device 100 with one another. Note here that the transponder 600 can be omitted (i) in a case where the record reproduction device 500 and the shutter glasses 400 are directly connected with the display device 100, (ii) in a case where the shutter glasses 400 are connected with the display device 100 without the wires, or (iii) in the like case.

[Schematic Configuration of Image Watching Glasses Identification Device 10]

Figure 1:
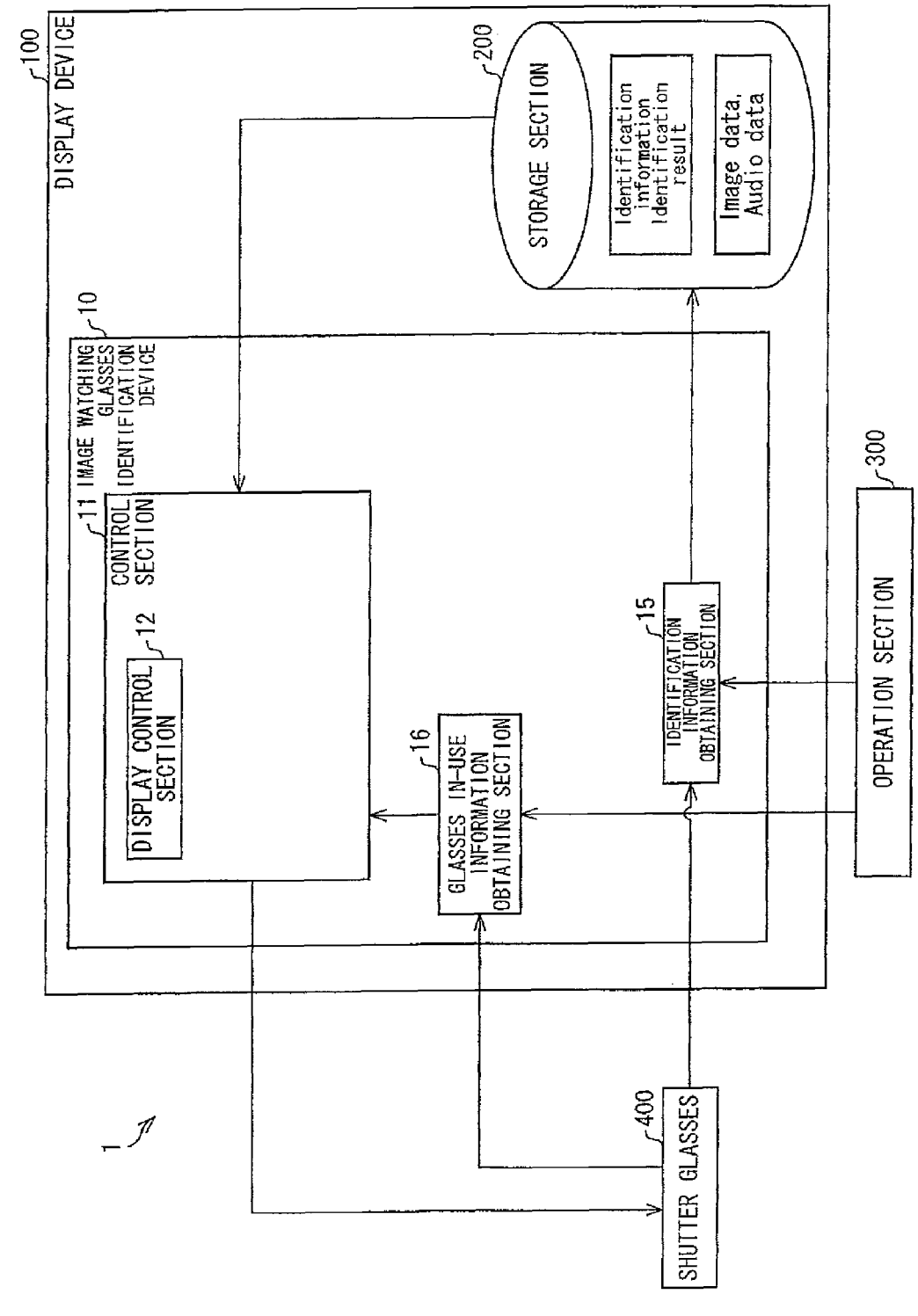
FIG. 1 is a block diagram schematically illustrating how an image watching glasses identification device in accordance with the present invention is configured.

The following description discusses the image watching glasses identification device 10 with reference to FIG. 1. FIG. 1 is a block diagram schematically illustrating how the image watching glasses identification device 10 is configured.

The image watching glasses identification device 10 causes the display device 100 to display, when a viewer watches through a pair of the image watching glasses 400 an image displayed on the display device 100, an identification result associated with an identification information item for identifying the pair of the image watching glasses 400.

As illustrated in FIG. 1, the image watching glasses identification device 10 includes: a control section 11; an identification information obtaining section (identification information obtaining means) 15; and an glasses in-use information obtaining section (in-use information obtaining means) 16.

The identification information obtaining section 15 obtains, from each pair of the shutter glasses 400, an identification information item unique to the each pair of the shutter glasses 400. Then, the identification information obtaining section 15 stores the identification information item on a storage section 200. The identification information item is an information item for identifying a specified pair of the shutter glasses 400, and is represented by for example an identification number, an identification name, or the like. For example, an identification information item of the shutter glasses 400A is represented by an identification number "1" and an identification name "Shutter Glasses A", while an identification information item of the shutter glasses 400B is represented by an identification number "2" and an identification name "Shutter Glasses B". Alternatively, the identification information item can be represented by address information, such as an IP address, which is allocated to each pair of the shutter glasses 400. That is, the identification information item is not limited to a particular kind, as long as a corresponding pair of the shutter glasses 400 can be identified on the basis of the identification information item. The identification number can be represented by an alphanumeric character etc. so as to be identified by the device, or can be any language so as to be easily identified by the viewer.

The identification information obtaining section 15 obtains the identification information item from each pair of the shutter glasses 400 in the following manner.

For example, the identification information item is automatically sent from the each pair of the shutter glasses 400 to the identification information obtaining section 15, in a case where the each pair of the shutter glasses 400 and the display device 100 (or the image watching glasses identification device 10) (i) are connected with each other with or without wires and (ii) can communicate with each other bi-directionally. Alternatively, the each pair of the shutter glasses 400 sends the identification information item to the identification information obtaining section 15 in response to a request from the display device 100 (or the image watching glasses identification device 10). Alternatively, the identification information item is automatically sent from the each pair of the shutter glasses 40 to the identification information obtaining section 15, in a case where the each pair of the shutter glasses 400 and the display device 100 (or the image watching glasses identification device 10) are connected with each other such that one-way communication from the each pair of the shutter glasses 40 to the display device 100 (or the image watching glasses identification device 10) only is available. Alternatively, the viewer inputs the identification information item into the identification information obtaining section 15 via the operation section 300, in a case where the display device 100 and the each pair of the shutter glasses 400 are connected with each other such that one-way communication from the display device 100 to the each pair of the shutter glasses 400 only is available. Further, the viewer inputs the identification information item into the identification information obtaining section 15 via the operation section 300, in a case where the display device 100 and the each pair of the shutter glasses 400 are not connected with each other such that communication between the display device 100 and the each pair of the shutter glasses 400 is available.

As described above, the identification information obtaining section 15 is capable of obtaining, directly from each pair of the shutter glasses 400 or via the viewer, the identification information item of the each pair of the shutter glasses 400.

According to FIG. 1, the storage section 200 is provided outside the image watching glasses identification device 10 and inside the display device 100. Note, however, that the storage section 200 can be included in the image watching glasses identification device 10, or can be provided outside the display device 100.

In the storage section 200, (i) image data corresponding to an image to be displayed on the display device 100 and (ii) audio data corresponding to a sound accompanied by the image can be stored along with the identification information item.

Further, in the storage section 200, (a) the identification information item and (b) an identification result associated with the identification information item can be stored as shown in for example the following identification information-identification result association table (Table 1):

TABLE 1

| Identification Information | Identification Result |
|---|---|
| Glasses 1 | You are User 1 |
| Glasses 2 | You are User 2 |
| Glasses 3 | You are User 3 |
| Glasses 4 | You are User 4 |

The identification result is not limited to those shown in Table 1, and can be "You are using Glasses A", "This image can be watched through Glasses A", "User A is watching this image", or the like.

The glasses in-use information obtaining section obtains a glasses in-use information item, which indicates whether or not a corresponding pair of the shutter glasses 400 is in use. Then, the glasses in-use information obtaining section 16 informs the control section 11 that whether or not the corresponding pair of the shutter glasses 400 is in use.

The glasses in-use information obtaining section 16 obtains the glasses in-use information item in the following manner. For example, the glasses in-use information item is automatically sent from a corresponding pair of the shutter glasses 400 to the glasses in-use information obtaining section 16 in a case where the corresponding pair of the shutter glasses 400 and the display device 100 (or the image watching glasses identification device 10) (i) are connected with each other with or without wires and (ii) can communicate with each other bi-directionally. Alternatively, the corresponding pair of the shutter glasses 400 sends the glasses in-use information item to the glasses in-use information obtaining section 16 in response to a request from the display device 100 (or the image watching glasses identification device 10). Alternatively, the glasses in-use information item is automatically sent from the corresponding pair of the shutter glasses 400 to the glasses in-use information obtaining section 16, in a case where the corresponding pair of the shutter glasses 400 and the display device 100 (or the image watching glasses identification device 10) are connected with each other such that one-way communication from the corresponding pair of the shutter glasses 40 to the display device 100 (or the image watching glasses identification device 10) only is available. Alternatively, the viewer inputs the glasses in-use information item into the glasses in-use information obtaining section 16 via the operation section 300, in a case where the display device 100 and the corresponding pair of the shutter glasses 400 are connected with each other such that one-way communication from the display device 100 to the corresponding pair of the shutter glasses 400 only is available. Further, even in a case where the display device 100 (or the image watching glasses identification device 10) and the corresponding pair of the shutter glasses 400 are not connected with each other such that communication between the display device 100 (or the image watching glasses identification device 10) and the corresponding pair of the shutter glasses 400 is available, the glasses in-use information obtaining section 16 is possible to obtain the glasses in-use information item from the viewer via the operation section 300.

The glasses in-use information item is automatically sent from a corresponding pair of the shutter glasses 400 to the glasses in-use information obtaining section 16 for example by making the following settings in advance. That is, the settings are made so that (i) the glasses in-use information item will be automatically sent at a time when the corresponding pair of the shutter glasses 400 is switched ON or (ii) the glasses in-use information item is always sent automatically from the corresponding pair of the shutter glasses 400 to the glasses in-use information obtaining section 16. Alternatively, as described earlier, the glasses in-use information item can be sent from the corresponding pair of the shutter glasses 400 in response to a request from the display device 100 (or the image watching glasses identification device 10).

The control section 11 includes a display control section (display controlling means) 12. The display control section 12 obtains, from the storage section 200, the identification result (refer to Table 1) associated with the identification information item obtained by the identification information obtaining section 15, and then causes the display device 100 to display the identification result. Specifically, in a case where the identification information item obtained by the identification information obtaining section 15 is "Shutter glasses A", the display control section 12 obtains, from the storage section 200, the identification result "You are User A" that is associated with the identification information item "Shutter glasses A". Then, the display section 12 causes the display device 100 to display the identification result "You are User A".

[Schematic Configuration of Image Watching Glasses Identification Device 20]

Figure 3:
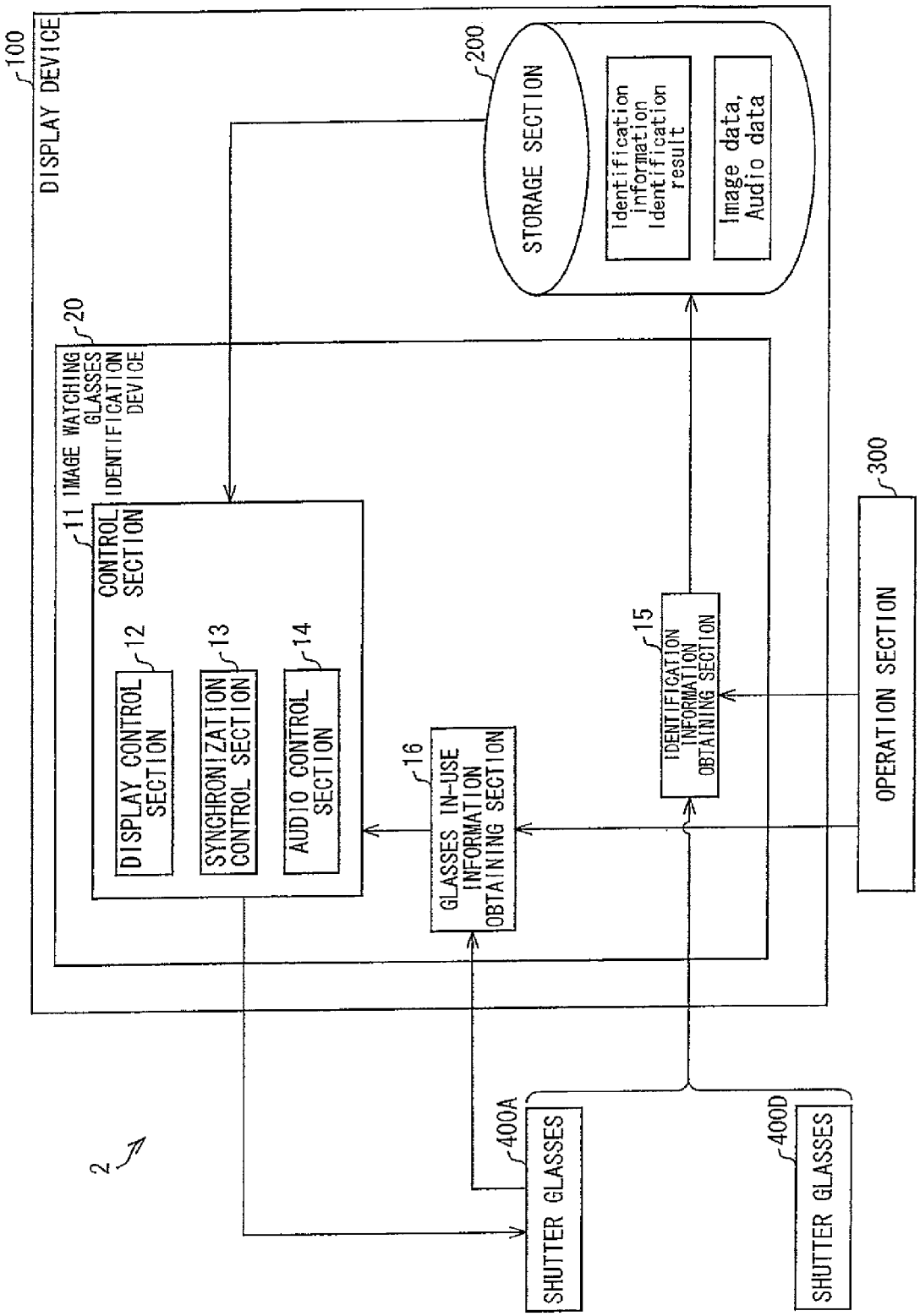
FIG. 3 is a block diagram schematically illustrating how another image watching glasses identification device in accordance with the present invention is configured.

The following description discusses, with reference to FIG. 3, another image watching glasses identification device 20 of the present embodiment. FIG. 3 is a block diagram schematically illustrating how the image watching glasses identification device 20 is configured.

The following description is based on the assumption that, in the image watching system 2 according to FIG. 3, (i) two pairs of the shutter glasses 400, i.e., the shutter glasses 400A and the shutter glasses 400B, are in use and (ii) the shutter glasses 400A and the shutter glasses 400B each include a speaker (audio outputting means) from which a sound is outputted.

The control section 11 of the image watching glasses identification device 20 further includes a synchronization control section (synchronization controlling means) 13 and an audio control section (audio controlling means) 14, in addition to the control section 12.

The synchronization control section 13 synchronizes (i) a timing at which at least one of a shutter for a right eye and a shutter for a left eye of each pair of the shutter glasses 400 is opened and (ii) a timing at which the display control section 12 causes the display device 100 to display the identification result or an image. This is specifically described below with reference to FIG. 4.

Assume that (i) there are two viewers wearing the shutter glasses 400A and the shutter glasses 400B, respectively, and (ii) a viewer wearing the shutter glasses 400A watches a three-dimensional image and a viewer wearing the shutter glasses 400B watches a two-dimensional image. The following description discuses, with reference to FIG. 4, how the synchronization control section 13 and the shutter glasses 400A and the shutter glasses 400B operate.

FIG. 4 illustrates tables showing how the synchronization control section 13 and the shutter glasses 400A and the shutter glasses 400B operate. (a) of FIG. 4 is a table showing timings at which an image A and an image B are displayed on the display device 100. (b) of FIG. 4 is a table showing how the shutters of the shutter glasses 400A operate. (c) of FIG. 4 is a table showing how the shutters of the shutter glasses 400B operate.

First, the display control section 12 obtains (i) image data corresponding to the image A and (ii) image data corresponding the image B, and then causes the display device 100 to alternately display the image A and the image B (refer to (a) of FIG. 4). Note in (a) of FIG. 4 that the letter "Y" denotes that an image is displayed on the display device 100, and the letter "N" denotes that the image is not displayed on the display device 100. Further, the image A and the image B are an image for a right eye and an image for a left eye, respectively, each of which is a constituent of the three-dimensional image.

As described earlier, the viewer wearing the shutter glasses 400A watches the three-dimensional image. In order for the viewer wearing the shutter glasses 400A to watch the three-dimensional image, the synchronization control section 13 transmits a shutter drive signal to the shutter glasses 400A. The shutter drive signal causes, when the image B, which is for a left eye, is displayed on the display device 100, (i) the shutter for the right eye of the shutter glasses 400A to be closed and (ii) the shutter for the left eye of the shutter glasses 400A to be opened. Next, the synchronization control section 13 transmits another shutter drive signal to the shutter glasses 400A. The another shutter drive signal causes, when the image A, which is for a right eye, is displayed on the display device 100, (a) the shutter for the left eye of the shutter glasses 400A to be closed and (b) the shutter for the right eye of the shutter glasses 400A to be opened. Thereby, the shutter glasses 400A operate, in accordance with these shutter drive signals, such that (I) the shutter for the left eye is closed and the shutter for the right eye is opened when the image A is displayed on the display device 100 and (II) the shutter for the right eye is closed and the shutter for the left eye is opened when the image B is displayed on the display device 100. Accordingly, the viewer wearing the shutter glasses 400A can see the image B with the left eye and see the image A with the right eye. In this way, the viewer is given a three-dimensional impression.

Although the above description discussed a case where the number of the viewers is two, the number of the viewers is not limited to two. Therefore, for example, another viewer can watch, through the shutter glasses 400C, (i) the image B (i.e., two-dimensional image) or (ii) both the image A and the image B (i.e., three-dimensional image).

Specifically, the another viewer can watch, through the shutter glasses 400C, (i) both the image A and the image B (i.e., three-dimensional image) in a case where the shutter glasses 400C carry out synchronous operation in the same manner as the shutter glasses 400A, or (ii) the image B (i.e., two-dimensional image) in a case where the shutter glasses 400C carry out synchronous operation in the same manner as the shutter glasses 400B. That is, even in a case where the number of viewers is two or more, it is possible for the viewers to watch an identical image as long as respective pairs of the shutter glasses 400 worn by the viewers carry out synchronous operation in an identical manner. Since the viewers watch the identical image, the identification result (shown in Table 1) can be for example: "You are User A or User C", "You are using Glasses A or Glasses C", "This image can be watched through Glasses A or Glasses C", "User A and User C are watching this image", or the like.

As described above, it is possible for a plurality of viewers to watch an identical image by causing respective pairs of the shutter glasses 400 to carry out synchronous operation in an identical manner. This applies to all the following descriptions.

Further, the synchronization control section 13 synchronizes (i) a timing at which the shutter for the right eye is opened and (ii) a timing at which the display control section 12 causes the display device 100 to display the identification result (e.g., "You are User A"). This makes it possible for a viewer to see, at the timing at which the shutter for the right eye is opened, the identification result "You are User A" displayed on the display device 100.

Next, the following description discusses, with reference to (c) of FIG. 4, how the synchronization control section 13 and the shutter glasses 400B operate.

As described earlier, the viewer wearing the shutter glasses 400B watches the two-dimensional image. In order for the viewer to watch the two-dimensional image, the synchronization control section 13 transmits a shutter drive signal to the shutter glasses 400B. The shutter drive signal causes, when the image B, which is for a left eye, is displayed on the display device 100, the shutter for the right eye and the shutter for the left eye of the shutter glasses 400B to be opened. Next, the synchronization control section 13 transmits another shutter drive signal to the shutter glasses 400B. The another shutter drive signal causes, when the image A, which is for a right eye, is displayed on the display device 100, the shutter for the right eye and the shutter for the left eye of the shutter glasses 400B to be closed.

Thereby, the shutter glasses 400B operate, in accordance with these shutter drive signals, such that (i) the shutter for the right eye and the shutter for the left eye are opened when the image B is displayed on the display device 100 and (ii) the shutter for the right eye and the shutter for the left eye are closed when the image A is displayed on the display device 100. Accordingly, the viewer wearing the shutter glasses 400B can watch the two-dimensional image.

As described above, the shutter glasses 400B operate such that the shutter for the right eye and the shutter for the left eye are opened when the image B is displayed on the display device 100. Under such circumstances, if (i) the timing at which the shutter for the right eye and the shutter for the left eye are opened and (ii) the timing at which the display control section causes the display device 100 to display the identification result (e.g., "You are User B") are synchronized with each other by the synchronization control section 13, the following problem occurs. That is, the identification result "You are User B" is visible also to the viewer (i.e., User A) wearing the shutter glasses 400A, which carry out synchronous operation in a manner as shown in (b) of FIG. 4. In other words, in a case where a plurality of viewers watch an identical image, an identification result displayed on the display device 100 may be correct for one viewer but incorrect for another viewer.

This problem can be solved by either one of the following two methods.

A first method is a method of causing, in a case where a two-dimensional image and a three-dimensional image are simultaneously playing to a plurality of viewers, only the image A to contain the identification result "You are User A" and the image B to contain no identification result by way of exception. This is because the image B is visible to two or more of the plurality of viewers.

A second method is a method of guiding, before each of the plurality of viewers starts watching an image, the each of the plurality of viewers to a setting display where an identification result corresponding to the each of the plurality of viewers is displayed. Thereby, the each of the plurality of viewers is individually notified of the identification result corresponding thereto. As an alternative, the second method can be a method of forcing, temporarily, (i) a user A to watch only an image A that contains an identification result "You are User A" and (ii) a user B to watch only an image B that contains an identification result "You are User B". Thereby, a plurality of viewers are notified of their corresponding identification results.

According to these methods, even in a case where an identical image is watched by a plurality of viewers, it is possible to cause each of the plurality of viewers to correctly recognize a corresponding identification result. With the corresponding identification result, the each of the plurality of viewers identifies a pair of shutter glasses worn by the each of the plurality of viewers. This solves the foregoing problem.

These methods can be achieved in the following manner. That is, upon determination by the control section 11 (or the display control section 12) that a plurality of viewers are about to watch an identical image, the control section 11 (or the display control section 12) carries out a display based on the above methods.

Since the display control section 12, the synchronization control section 13, and the shutter glasses 400A and the shutter glasses 400B operate like above, at least one of the plurality of viewers can see both (i) a desired image and (ii) an identification result contained in the image, which are displayed on the display device 100.

Further, even in a case where the viewer wearing the shutter glasses 400A and the viewer wearing the shutter glasses 400B are watching images of different kinds (i.e., in a case where one watches a two-dimensional image and the other watches a three-dimensional image), the synchronization control section 13 can cause at least one of these viewers to recognize an identification result "You are User A", "You are User B", or the like.

Figure 5:
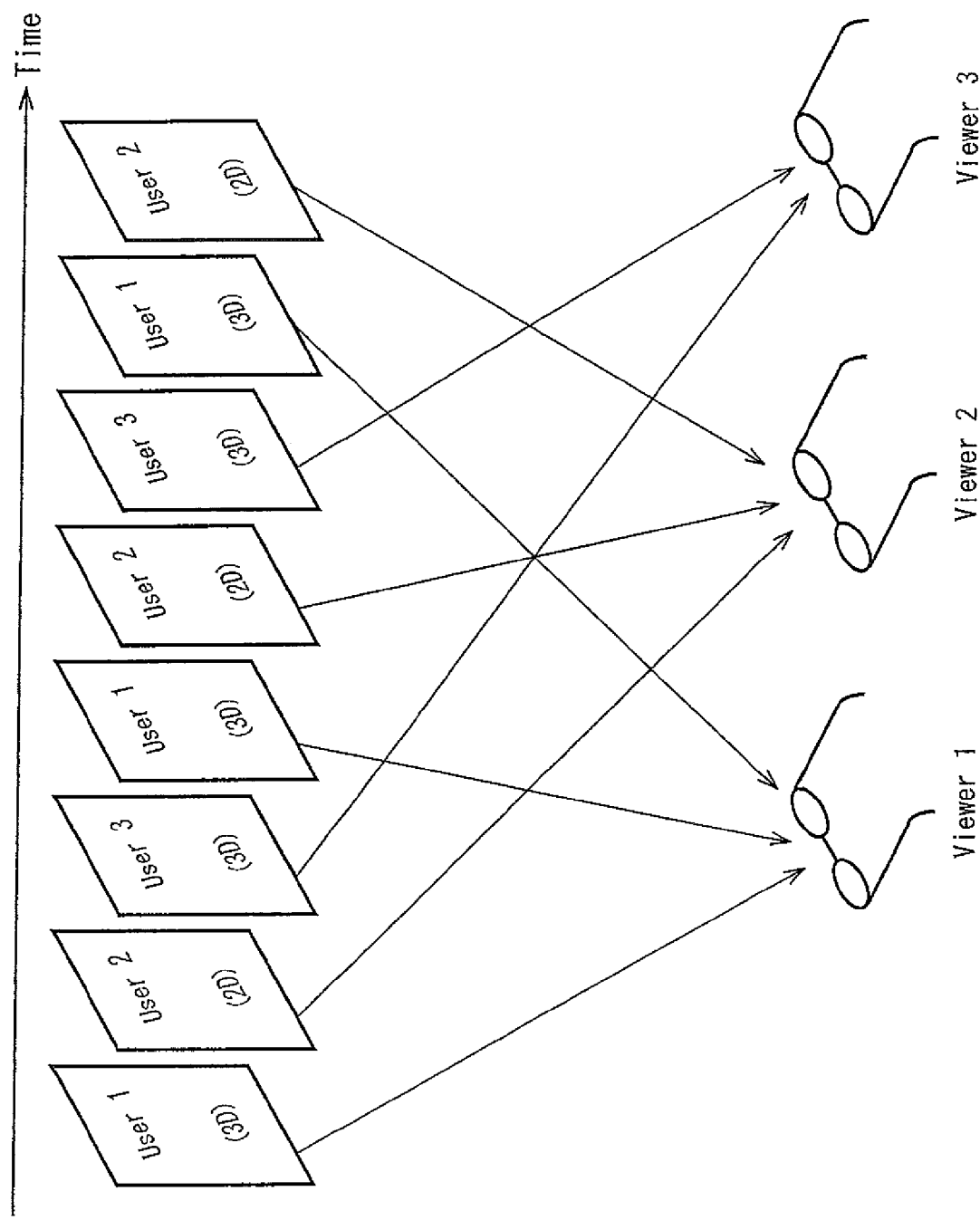
FIG. 5 is a conceptual view illustrating how a plurality of viewers recognize respective corresponding identification results.

FIG. 5 is a conceptual diagram illustrating how a plurality of viewers recognize respective corresponding identification results. According to FIG. 5, identification results "User 1" through "User 3" are displayed with respect to respective three viewers (viewers 1 thorough 3). Along with the identification results, respective corresponding setting messages, which indicate that the viewer 1 is watching a three-dimensional image, the viewer 2 is watching a two-dimensional image, and the viewer 3 is watching a three-dimensional image, respectively, are displayed. Hereinafter, an image containing a corresponding identification result and a corresponding setting message is referred to as a setting confirmation image. Note in FIG. 5 that the viewers 1 through 3 are watching respective corresponding setting confirmation images. Further, in FIG. 5, a time axis runs from left to right.

According to FIG. 5, the viewers 1 through 3 are watching respective different images. That is, the display control section 12 is causing the display device 100 to sequentially display images corresponding to the respective viewers 1 thorough 3, in order of "Image for viewer 1", "Image for viewer 2", "Image for viewer 3", "Image for viewer 1", "Image for viewer 2", and "Image for viewer 3". In the meantime, the synchronization control section 13 is supplying shutter drive signals to the shutter glasses 400. The shutter drive signals cause the shutter for the right eye and the shutter for the left eye of each pair of the shutter glasses 400 to be opened and closed in a manner described with reference to (c) of FIG. 4. The shutter for the right eye and the shutter for the left eye of the each pair of the shutter glasses 400 are opened and closed in accordance with the shutter drive signals. This causes the viewers 1 through 3 to see the respective corresponding setting confirmation images. The setting confirmation images watched by the respective viewers 1 through 3 contain respective corresponding identification results, i.e., "User 1", "User 2", and "User 3". This makes it possible for each of the viewers 1 through 3 to recognize, from a corresponding one of the setting confirmation images displayed on the display device 100, (i) an identification result specifying a pair of the shutter glasses 400 worn by the each of the viewers 1 through 3 and (ii) a setting message corresponding to the image watched by the each of the viewers 1 through 3.

Note here that, according to the image watching system 2 of FIG. 3, two pairs of the shutter glasses 400, i.e., the shutter glasses 400A and the shutter glasses 400B, are in use. However, the number of pairs of the shutter glasses 400 in use is not limited to two, and can be any number. The setting confirmation images make it possible for the viewers to each recognize (i) a corresponding identification result and (ii) a setting message corresponding to the image watched by the each of the viewers.

The display control section 12 can be configured such that it causes, upon receipt of an in-use information item obtained by the glasses in-use information obtaining section 16, the display device 100 to display an image to be watched through a corresponding pair of the shutter glasses 400.

According to this configuration, it is not necessary to cause the display device 100 to always display the image to be watched through the corresponding pair of the shutter glasses 400. This is because the display control section 12 causes the display device 100 to display the image upon input, into the control section 11, of the in-use information item obtained by the glasses in-use information obtaining section 16.

This achieves an advantage that qualities of images watched through pairs of the shutter glasses 400 are improved, because the images are prevented from being unnecessarily displayed. Specifically, assume that (i) the number of pairs of the shutter glasses 400 is four and (ii) four different images are watched through the respective four pairs of the shutter glasses 400. In this case, the display device 100 is supposed to time-divisionally display the four different images corresponding to the respective four pairs of the shutter glasses 400. However, according to the above configuration, only two of the four different images are time-divisionally displayed on the display device 100 in a case where two of the four pairs of the shutter glasses 400 are not in use. That is, the number of images time-divisionally displayed on the display device 100 is reduced from four to two. This makes it possible for each of the viewers to watch a corresponding image for twice as long a period of time. Accordingly, it is possible to achieve an advantage that an image quality such as brightness, smoothness, or the like of the corresponding image is improved. A change of the number of images time-divisionally displayed affects brightness, of each of the images, which is perceived by a corresponding viewer. That is, the change of the number of images time-divisionally displayed affects brightness obtained when the images are watched through the corresponding pair of the image watching glasses. In a case where a viewer wants to watch a corresponding image with constant perceived brightness, the display device 100 just needs to change luminance of a display. Even in that case, the reduction of the number of the images time-divisionally displayed makes it possible for the viewer to watch the corresponding image with improved smoothness.

It should be noted that the configuration achieves the above advantage only if the synchronization control section 13 carries out synchronous control of the timing at which the shutters of each pair of the shutter glasses 400 are opened and closed. Since the synchronous control was already described in detail, the specific description therefor is omitted here.

The following description discusses the audio control section 14. The audio control section 14 obtains, from the storage section 200, audio data corresponding to a sound accompanied by an image that is to be displayed on the display device 100. Then, the audio control section 14 causes a pair of the shutter glasses 400, through which the image corresponding to the sound is to be watched, to output the sound from a speaker.

That is, the audio control section 14 carries out a control so that, in a case where an image A is to be watched through the shutter glasses 400A, a sound A accompanied by the image A is outputted from a speaker of the shutter glasses 400A. In this way, each viewer wearing a corresponding pair of the shutter glasses 400 can hear a sound accompanied by an image to be watched through the corresponding pair of the shutter glasses 400.

Note that audio output processing, such as amplification of audio data with use of an amplifier, can be carried out by a commonly-known method. That is, the audio output processing can be carried out by the image watching glasses identification device 10 or the display device 100, which includes an audio output processing circuit (not illustrated). Detailed descriptions of the audio output processing are omitted here.

[Case where One (1) Operation Section 300 is Shared by Viewers]

The foregoing description conceptually discussed, with reference to FIG. 5, how the plurality of viewers recognize the respective corresponding identification results. The following description discusses, with reference to FIG. 6, how a plurality of viewers recognize respective corresponding identification results in a case where one (1) operation section 300 is shared by the plurality of viewers.

Figure 6:
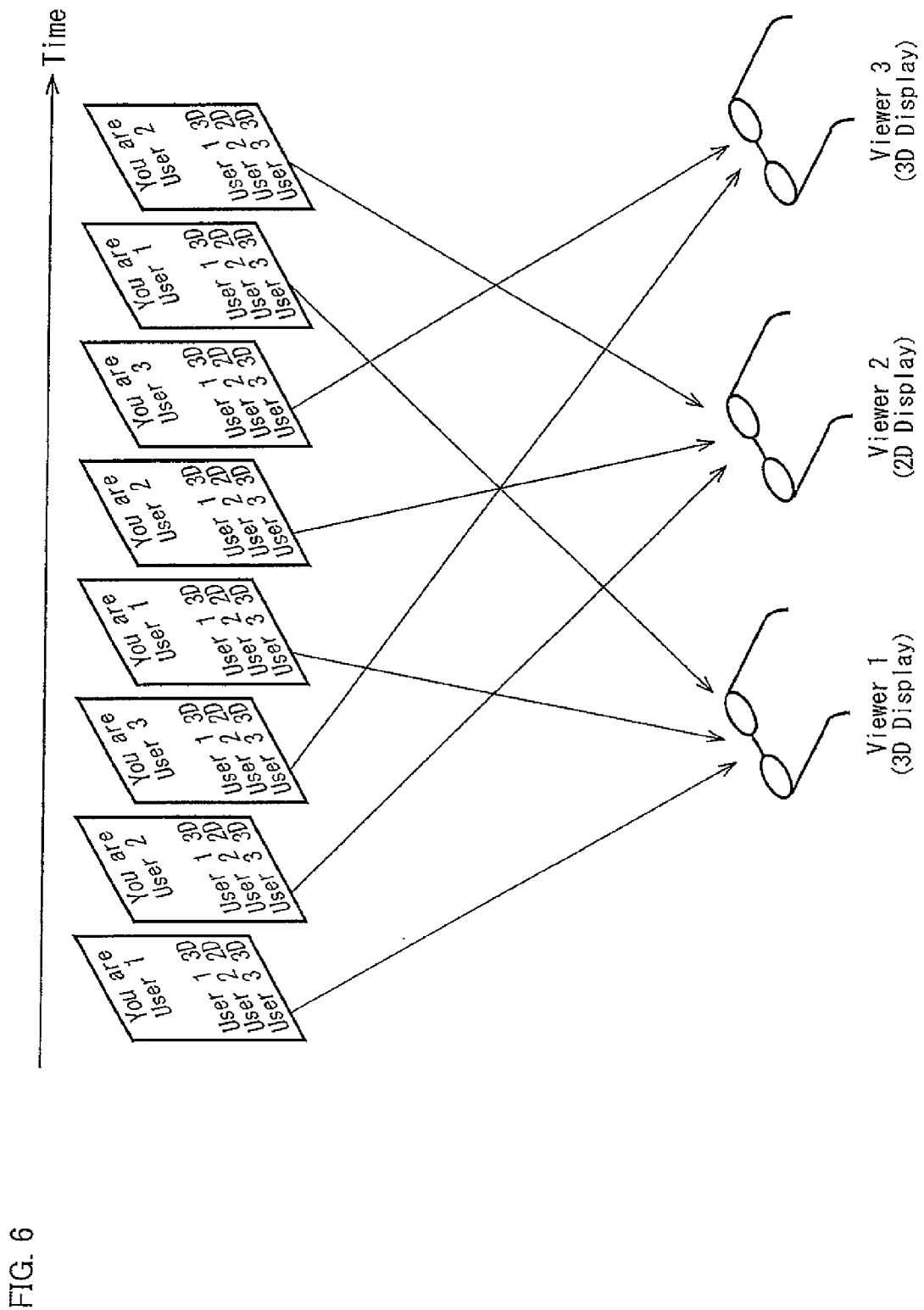
FIG. 6 is a view illustrating how a plurality of viewers recognize respective corresponding identification results in a case where one (1) operation section is shared by the plurality of viewers.

FIG. 6 is a view illustrating how the plurality of viewers recognize the respective corresponding identification results in the case where one (1) operation section 300 is shared by the plurality of viewers. According to FIG. 6, a representative of the plurality of viewers carries out input operation via the operation section 300. Note in FIG. 6 that the number of the plurality of viewers is three (a viewer 1, a viewer 2, and a viewer 3), and each of the three viewers is watching a setting confirmation image saying that the viewer 1 is watching a three-dimensional image, the viewer 2 is watching a two-dimensional image, and the viewer 3 is watching a three-dimensional image.

The situation shown in FIG. 6 arises for example when the representative inputs, via the operation section 300, identification information items (e.g., an identification number, an identification name, or the like) of respective pairs of the shutter glasses 400 into the image watching glasses identification device 200. The representative inputs the identification information items while watching the setting confirmation image. Note here that the three viewers are wearing the respective pairs of the shutter glasses 400, and do not know identification numbers of the respective corresponding pair of the respective shutter glasses 400.

In this case, in accordance with the method described with reference to FIG. 5, a corresponding one of identification results "You are User 1", "You are User 2", and "You are User 3" is displayed individually to each of the three viewers. Further, a setting message "User 1 3D/User 2 2D/User 3 3D" is displayed to all of the three viewers. That is, the display control section 12 causes the display device 100 to display (i) a corresponding one of the identification results "You are User 1", "You are User 2", and "You are User 3" individually to each of the three viewers and (ii) the setting message "User 1 3D/User 2 2D/User 3 3D" to all of the three viewers.

This makes it possible for each of the three viewers to recognize a corresponding one of the identification results "You are User 1", "You are User 2", and "You are User 3". Thereby, the viewer 1 can recognize that the viewer is the user 1, and recognize, from the setting message "User 1 3D/User 2 2D/User 3 3D" visible to all of the three viewers, that viewer 1 can watch a three-dimensional image. Further, the viewer 2 can recognize that the viewer 2 is the user 2, and recognize, from the setting message "User 1 3D/User 2 2D/User 3 3D" visible to all of the three viewers, that the viewer 2 can watch a two-dimensional image.

In a case where only one (1) operation section 300 is shared by the plurality of viewers like above, it is preferable to cause the display device 100 to display a screen saying "User 1 3D/User 2 2D/User 3 3D" or the like, which screen is visible to all of the plurality of viewers. In this case, viewers other than the representative cannot change image settings because the representative is the only one who can change the image settings with use of the operation section 300. Note, however, that each of the three viewers can know, from the screen visible to all of the three viewers, for example what kind of images are watched by the other viewers. This makes it possible for the representative to change not only settings of an image watched by the representative, but also settings of images watched by the other viewers. Further, this makes it possible for each of the viewers other than the representative to ask the representative to change settings of a target image. Since any of the three viewers can become the representative, it is possible for each of the three viewers to change settings of a corresponding image even if only one (1) operation section 300 is shared by the three viewers.

Note here that, according to FIG. 6, the screen displayed on the display device 100 with respect to all of the three viewers says "User 1 3D/User 2 2D/User 3 3D". However, the screen is not limited to this, and therefore can be any of various screens.

[Case where Operation Sections 300 are Provided for Respective Viewers]

The foregoing description discussed, with reference to FIG. 6, how the plurality of viewers recognize the respective corresponding identification results in the case where only one (1) operation section 300 is shared by the plurality of viewers. The following description discusses, with reference to FIG. 7, how a plurality of viewers recognize respective corresponding identification results in a case where operation sections 300 are provided for the respective plurality of viewers.

Figure 7:
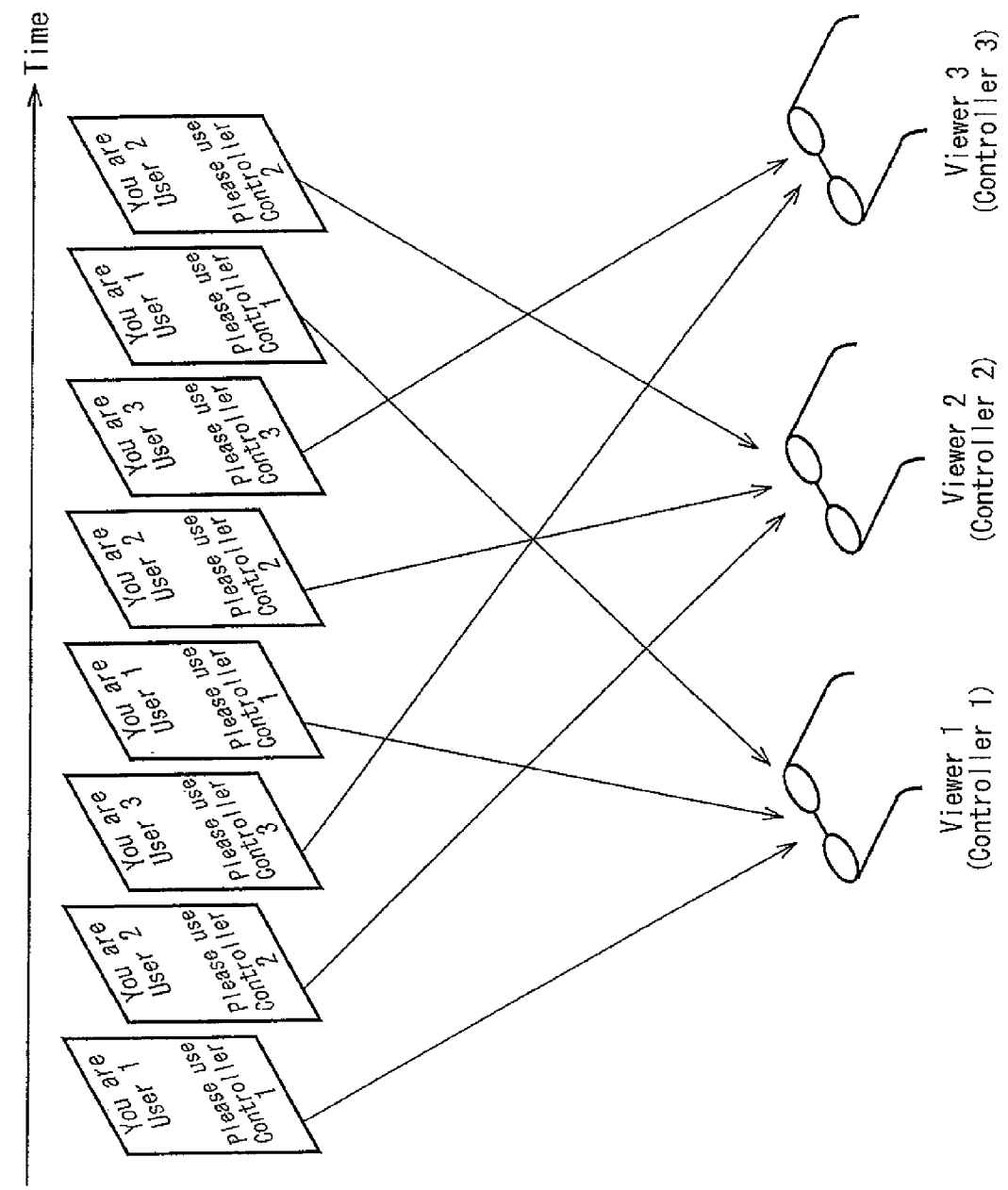
FIG. 7 is a view illustrating how a plurality of viewers recognize respective corresponding identification results in a case where there are operation sections for the respective plurality of viewers.

FIG. 7 is a view illustrating how the plurality of viewers recognize the respective corresponding identification results in the case where the operation sections 300 are provided for the respective plurality of viewers. Note in FIG. 7 that the number of the plurality of viewers is three.

In this case, in accordance with the method described with reference to FIG. 5, an identification result "You are User 1 Please use Controller 1" is displayed to the viewer 1, an identification result "You are User 2 Please use Controller 2" is displayed to the viewer 2, and an identification result "You are User 3 Please use Controller 3" is displayed to the viewer 3.

This makes it possible for each of the three viewers to identify, from the identification result displayed, a pair of the shutter glasses 400 worn by the each of the three viewers. This ensures that the each of the three viewers uses a right controller (i.e., a controller corresponding to the pair of the shutter glasses 400 worn by the each of the three viewers) to carry out input operation. Accordingly, it is possible to prevent each of the three viewers from accidentally changing someone else's settings as a result of accidental use of a wrong controller to carry out the input operation.

[Configuration in which Each Image Contains Part Visible to Plurality of Viewers]

According to this configuration, (i) a plurality of viewers are watching respective different images and (ii) a part of each of the images is visible to all of the plurality of viewers (such a part is hereinafter referred to as a common image). One example of such a common image is the "User 1 3D/User 2 2D/User 3 3D" in FIG. 6.

The common image is displayed in response to certain operation of the display control section 12. Specifically, the display control section 12 can cause the display device 100 to display the common image (i) in the case of the "one (1) operation section 300 is shared by viewers", (ii) in response to operation by a viewer via the operation section 300, or (iii) in the like case.

This configuration achieves the following advantage.

If no common image is contained in images viewed by the plurality of viewers, then what is visible to a viewer without wearing the shutter glasses 400 (such a viewer is hereinafter referred to as a "naked-eye viewer") is an image made up of a plurality of images superimposed each other. Therefore, it is difficult for the naked-eye viewer to recognize what images are displayed on the display device 100. This phenomenon becomes more obvious as the number of the images superimposed each other increases.

In this regard, according to this configuration, the common image is contained in each of the images viewed by the plurality of viewers. Therefore, the naked-eye viewer can recognize at least the common image, and thus can know from the common image what images are displayed on the display device 100. That is, since a part of each of the images watched by the plurality of viewers is the common image, such a part is visible even to the naked-eye viewer.

The following description discusses an alternative configuration in which the common image is contained in each of the images watched by the plurality of viewers.

Specifically, all or part of each of the images watched by the plurality of viewers is reduced, and the reduced images are arranged to form one (1) image that is to be displayed on the display device 100 as the common image. Such a common image is visible even to the naked-eye viewer, and thus enables the naked-eye viewer to recognize a part of each of the images watched by the plurality of viewers. Further, in a case where identification information items (identification results) of the respective plurality of viewers are contained in the respective images watched by the plurality of viewers, it is possible for the naked-eye viewer to know who is watching what kind of image. This makes it possible to achieve an evolutionary watching method, in which the naked-eye viewer is possible not only to know in what condition each of the plurality of viewers is in, but also to start, while the images are playing, watching a desired one of the images with use of a corresponding pair of the shutter glasses 400.

Further, each of the plurality of viewers, who are wearing respective pairs of the shutter glasses 400, can recognize from the common image in what condition each of the other viewers is in. This makes it possible to achieve an evolutionary watching method, in which each of the plurality of viewers can start watching one of the images being watched by the other viewers.

[Schematic Configuration of Image Watching Glasses Identification Device 30]

Figure 8:
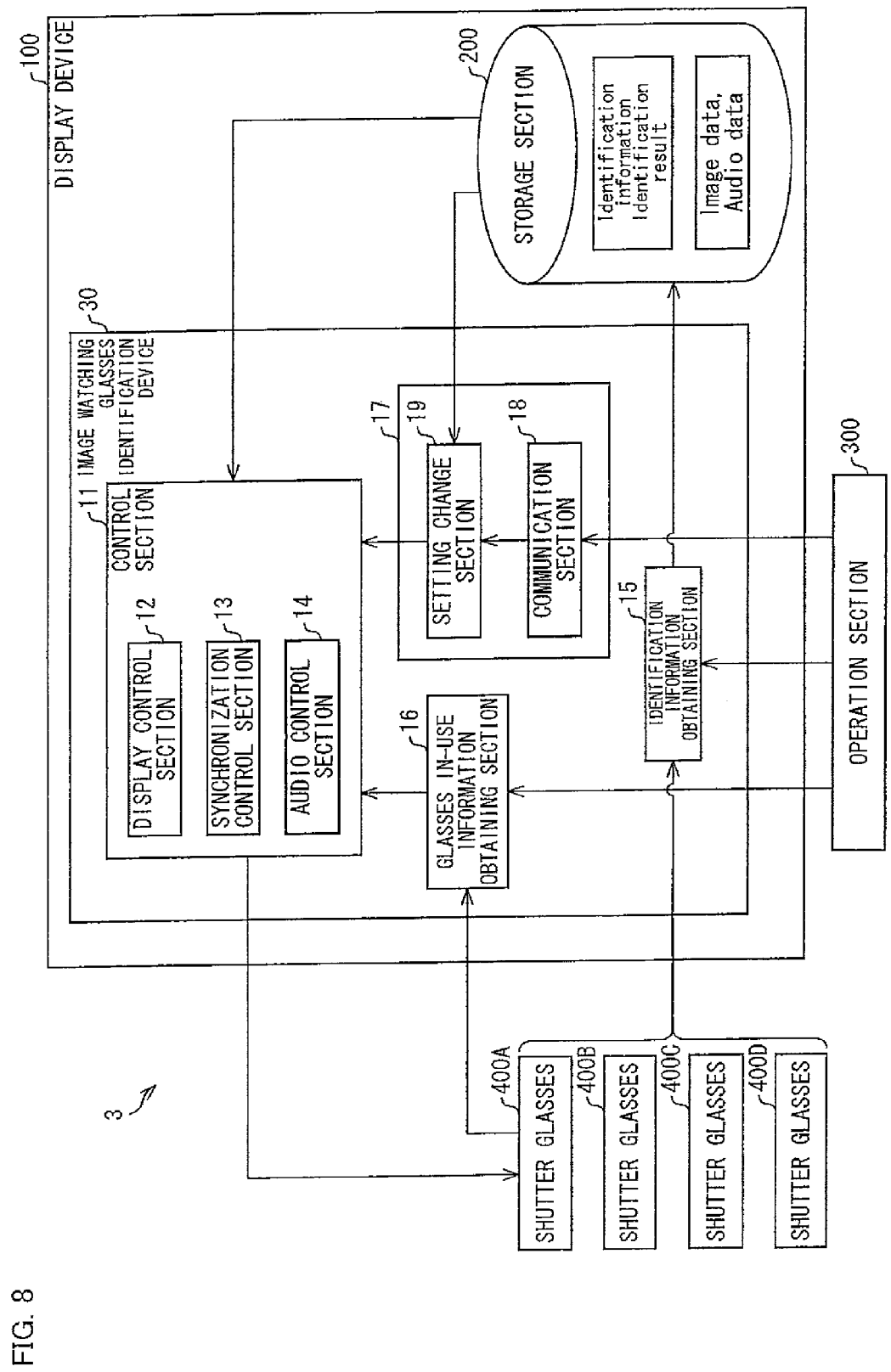
FIG. 8 is a block diagram schematically illustrating how a further image watching glasses identification device in accordance with the present invention is configured.

The following description discusses, with reference to FIG. 8, a further image watching glasses identification device 30 of the present embodiment. FIG. 8 is a block diagram schematically illustrating how the image watching glasses identification device 30 is configured. The following description is based on the assumption that the identification result shown in FIG. 6 etc. is being displayed on the display device 100.

The image watching system 3 according to FIG. 8 has a configuration identical to that of the image watching glasses identification device 20, except that the image watching system 3 further includes a command receiving section (command receiving means) that includes a communication section 18 and a setting change section 19.

The communication section 18 receives a command (hereinafter may be referred to as an "instruction signal"), for changing a setting of an image displayed on the display device 100 to another setting, which is inputted by a viewer via the operation section 300. For example, assume that a function of "changing image settings" is allocated to a manual operation button A of the operation section 300. In this case, the communication section 18 receives the instruction signal upon pressing of the manual operation button A by the viewer. Then, the communication section 18 supplies, to the setting change section 19, a signal indicating (a) that the communication section 18 has received the instruction signal and (b) contents of the instruction signal.

Upon receipt of the signal from the communication section 18, the setting change section 19 obtains, from the storage section 200, information regarding the another setting. For example, in a case where the setting change section 19 receives, from the communication section 18, a signal for changing an image 1 to an image 2, the setting change section 19 obtains, from the storage section 200, image data corresponding to the image 2. Note here that, in a case where the image 2 is accompanied by a sound, the setting change section 19 obtains also audio data corresponding to the sound. Then, the setting change section 19 supplies, to the control section 11, (i) an instruction for changing the image 1 to the image 2 and (ii) the image data and the audio data which correspond to the image 2. Hereinafter, the image data and the audio data may be collectively referred to as "setting information".

Alternatively, the setting change section 19 can receive, from the communication section 18, a signal for changing brightness of an image to another brightness. In this case, upon receipt of the signal, the setting change section 19 supplies, to the display control section 12, setting information regarding the another brightness.

Note here that the settings to be changed can be any settings regarding an image. For example, it is possible to (i) change an image to another image (e.g., change the image 1 to the image 2, or to change a 2D image to a 3D image), (ii) change qualities of an image (e.g., change brightness from bright to dark and vice versa), or (iii) the like.

Upon the control section 11 receiving the setting information from the setting change section 19, the display control section 12 causes the display device 100 to display an image according to the setting information. Further, the audio control section 14 causes a corresponding pair of the shutter glasses 400, through which the image displayed on the display device 100 is to be watched, to output through the speaker the sound accompanied by the image. Furthermore, the synchronization control section 13 synchronizes (i) a timing at which at least one of a shutter for a right eye and a shutter for a left eye of the corresponding pair of the shutter glasses 400 is opened and (ii) a timing at which the display control section 12 causes the display device 100 to display the identification result.

As described above, the image watching glasses identification device 30 includes the command receiving section 17. The command receiving section 17 receives a command, for changing a setting of the image displayed on the display device 100 to another setting, which is inputted by a viewer via the operation section 300. The command receiving section 17 supplies, to the control section 11, the setting information regarding the another setting. The control section 11 causes the display device 100 to display an image according to the setting information. As such, it is possible to achieve an evolutionary watching method, in which a viewer identifies a pair of the shutter glasses 400 worn by the viewer and thus can change settings of an image corresponding to the pair of the shutter glasses 400 worn by the viewer.

[Example of Application of Image Watching Glasses Identification Device]

The following description discusses one example of application of the image watching glasses identification device 30.

[Changing Images]

Figure 9:
FIG. 9 is a view illustrating an example of how a viewer changes settings of an image watched by the viewer. (a) of FIG. 9 is a view illustrating how the viewer is requested to confirm whose settings are going to be changed. (b) of FIG. 9 is a view illustrating current image settings that can be changed.

The following description discusses, with reference to FIG. 9, one example of how a viewer changes a currently-watched image to another image (e.g., changes an image 1 to an image 2, or changes a 2D image to a 3D image).

The following description is based on the assumption that the display control section 12 (i) has obtained, from the storage section 200, identification results (refer to Table 1) corresponding to respective pairs of the shutter glasses 400 and (ii) is causing the display device 100 to display the identification results in respective images to be watched through the respective pairs of the shutter glasses 400. Further, the function of "changing image settings" is allocated to for example the manual operation button A of the operation section 300. A screen shown in (a) of FIG. 9 is displayed on the display device 100 upon pressing of the manual operation button A by a viewer. The number of viewers is four, and a viewer 1 (also referred to as a "user 1") is about to change image settings.

FIG. 9 illustrates one example of how a viewer changes settings of a currently-watched image. (a) of FIG. 9 is a view illustrating how the viewer is requested to confirm whose settings are going to be changed. (b) of FIG. 9 is a view illustrating current image settings that can be changed.

First, the function of "changing image settings" is allocated to the manual operation button A of the operation section 300 in advance. Upon pressing of the manual operation button A by the viewer, a confirmation screen shown in (a) of FIG. 9 is displayed on the display device 100. In a case where one (1) operation section 300 (i.e., one (1) manual operation button A) is shared by a plurality of viewers, the confirmation screen shown in (a) of FIG. 9 is preferably visible to all of the plurality of viewers (i.e., visible through all pairs of the image watching glasses 400). This enables the all of the plurality of viewers to know who is about to change image settings. Note here that the viewer 1 recognizes himself/herself as the user 1, because the viewer 1 has seen a corresponding one of the identification results, such as "You are User 1", which is displayed on the display device 100. Therefore, the viewer 1 selects an item "Change settings of User 1". The item is selected by (i) placing a "○" (unfilled circle) in a target position of a first column and then (ii) pressing an "OK" button (not illustrated) of the operation section 300. Upon the selection of the item, the screen shown in (b) of FIG. 9 is displayed on the display device 100. Note here that the displaying of the screen shown in (a) of FIG. 9, which screen requests a viewer to confirm whose settings are going to be changed, can be omitted. In this case, it is possible to employ a configuration in which the screen shown in (b) of FIG. 9 is displayed on the display device 100 upon pressing of the manual operation button A by the viewer. For example, in a case where a plurality of viewers are provided with respective operation sections 300 (i.e., respective manual operation buttons A), it is possible to employ a configuration in which, as described earlier and later, each of the plurality of viewers (hereinafter may be referred to as users) (i) identifies a controller corresponding to the each of the plurality of viewers (i.e., a corresponding one of the operation sections 300) and (ii) carries out operation with use of the controller. Using the controller corresponding to the each of the plurality of viewers means that the each of the plurality of viewers confirms that he/she is a certain user. For this reason, the displaying of the screen shown in (a) of FIG. 9 can be omitted.

According to (b) of FIG. 9, items "Image watched by User 1", "Available images", and "Image quality" are displayed on the display device 100. Note, however, that the items displayed on the display device 100 are not limited to those described above, and therefore another item can further be displayed. Further, a display format of the screen shown in (b) of FIG. 9 is a mere example, and is not limited to that exemplified in (b) of FIG. 9. Furthermore, the screen shown in (b) of FIG. 9 needs to be visible at least to the user 1, who is about to change (or is changing) settings. A screen displayed to users other than the user 1, which users are not going to change settings, is not limited to that shown in (b) of FIG. 9, and therefore any other screen or image can be displayed to the users other than the user 1.

The item "Image watched by User 1" shown in (b) of FIG. 9 contains details of an image currently being watched by the user 1. The user 1 confirms, from this item, that (i) the user 1 is watching an "image 1", (ii) the "image 1" is a "2D" image, and (iii) the image 1 has attributes of "Recorded on Apr. 1, 2010, 2:30:00 Taro Yamamoto etc.".

The item "Available images" contains a list of images available for the user 1. According to (b) of FIG. 9, the images available for the use 1 are images 1 through 5. For example, according to the list, the image 2 is a 3D image and has attributes of "Recorded on Apr. 2, 2010, 2:00:00, Soccer". Since the user 1 can know attributes of the images 1 through 5, it is possible for the user 1 to select an image he/she wants to watch. The selection can be carried out by (i) placing the "○" (unfilled circle) on a target line and then (ii) pressing the "OK" button (not illustrated) of the operation section 300. Note here that, although image types (i.e., 2D or 3D) of the images 1 through 5 are fixed for convenience of description, it is possible to configure the list such that the image types can also be changed. This makes it possible for the user 1 to change both the images and image types.

The item "Image quality" enables a viewer to change brightness of a corresponding image. The brightness can be freely adjusted within a range from dark to bright. The brightness can be adjusted as needed depending on the image, before selection of the image from the "Available images".

Through the procedures described above, the user can change the currently-watched image from the image 1 (2D) to the image 2 (3D).

Figure 10:
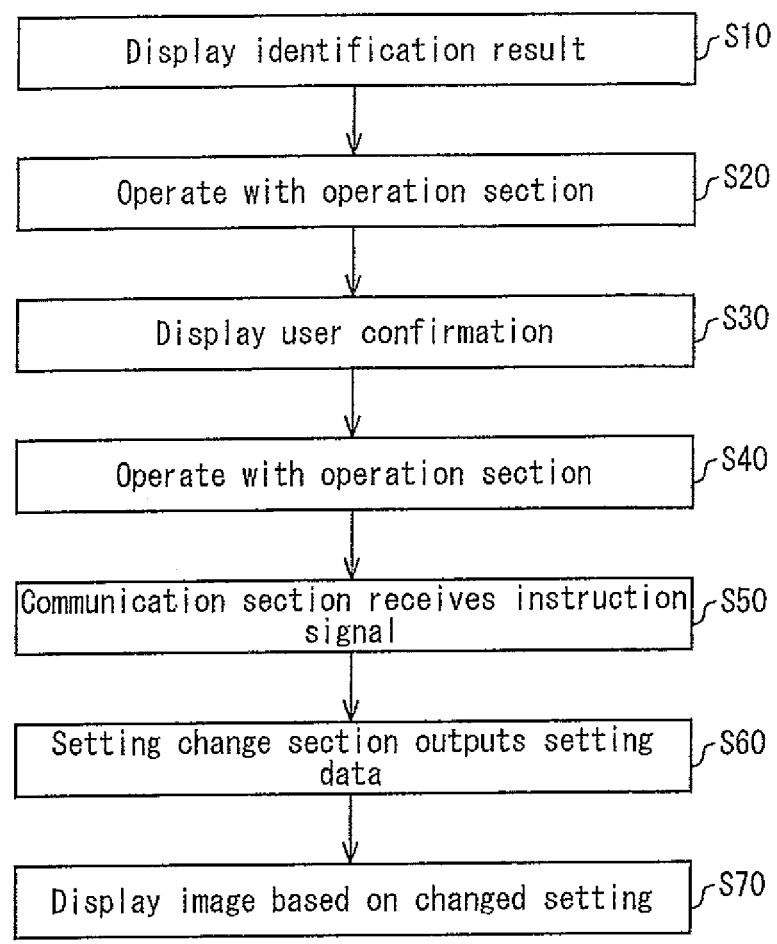
FIG. 10 is a flowchart illustrating how a viewer changes settings of an image watched by the viewer.

Next, the following description discusses, with reference to FIG. 10, how the viewer 1 changes a currently-watched image from the image 1 (2D) to the image 2 (3D). FIG. 10 is a flowchart illustrating how a viewer changes settings of an image currently watched by the viewer.

In step S10, the display control section 12 obtains, from the storage section 200, an identification result (refer to Table 1) associated with an identification information item obtained by the identification information obtaining section 15. Then, the display control section 12 causes the display device 100 to display the identification result. This allows the viewer 1 to recognize himself/herself as the user 1.

In step S20, the viewer 1, who wants to change settings of an image currently watched by the viewer 1, presses a button, to which the function of "changing image settings" is allocated, of the operation section 300.

In step S30, the communication section 18 receives a command, for changing a setting of the image displayed on the display device 100 to another setting, which is inputted by the viewer 1 via the operation section 300. Upon the receipt of the command, the communication section 18 causes the display control section 12 to operate so that a screen requesting the viewer 1 to confirm whose settings are going to be changed (see (a) of FIG. 9) is displayed. Note here that, data corresponding to the screen shown in (a) of FIG. 9 can be stored in the storage section 200 in advance so that the display control section 12 obtains the data from the storage section 200.

In step S40, the viewer 1 carries out, with use of the operation section 300, input operation in the screens shown in (a) and (b) of FIG. 9. Specifically, the viewer 1 selects the "Change settings of User 1" in the screen shown in (a) of FIG. 9, and selects the "Image 2" in the screen shown in (b) of FIG. 9.

In step S50, the communication section 18 receives an instruction signal, for changing the setting of the image displayed on the display device 100 to the another setting, which is inputted by the viewer 1 via the operation section 300. Then, the communication section 18 supplies, to the setting change section 19, a signal indicating (a) that the communication section 18 has received the instruction signal and (b) details of the instruction signal.

In step S60, upon receipt of the signal from the communication section 18, the setting change section 19 obtains, from the storage section 200, information regarding the another setting. For example, in a case where the setting change section 19 receives a signal for changing the image 1 to the image 2 from the communication section 18, the setting change section 19 obtains, from the storage section 200, image data corresponding to the image 2. Note here that, in a case where the image 2 is accompanied by a sound, the setting change section 19 obtains also audio data corresponding to the sound. Then, the setting change section 19 supplies, to the control section 11, (i) a command for changing the image 1 to the image 2 and (ii) the image data and the audio data which correspond to the image 2. Hereinafter, the image data and the audio data may be collectively referred to as "setting information".

In step S70, upon the control section 11 receiving the setting information from the setting change section 19, the display control section 12 causes the display device 100 to display an image corresponding to the setting information. Further, the synchronization control section 13 carries out synchronous control for example such that (i) a timing at which at least one of a shutter for a right eye and a shutter for a left eye of a corresponding pair of the shutter glasses 400 is opened is synchronized with (ii) a timing at which the display control section 12 causes the display device 100 to display the identification result. Furthermore, the audio control section 14 causes the corresponding pair of the shutter glasses 400, through which the image displayed on the display device 100 is to be watched, to output through the speaker the sound corresponding to the image.

As described above, the employment of the image watching glasses identification device 20 makes it possible for a viewer to identify a certain pair of the shutter glasses 400, and thus to change settings of an image corresponding to the certain pair of shutter glasses 400.

[Changing Remote Controllers]

Figure 11:
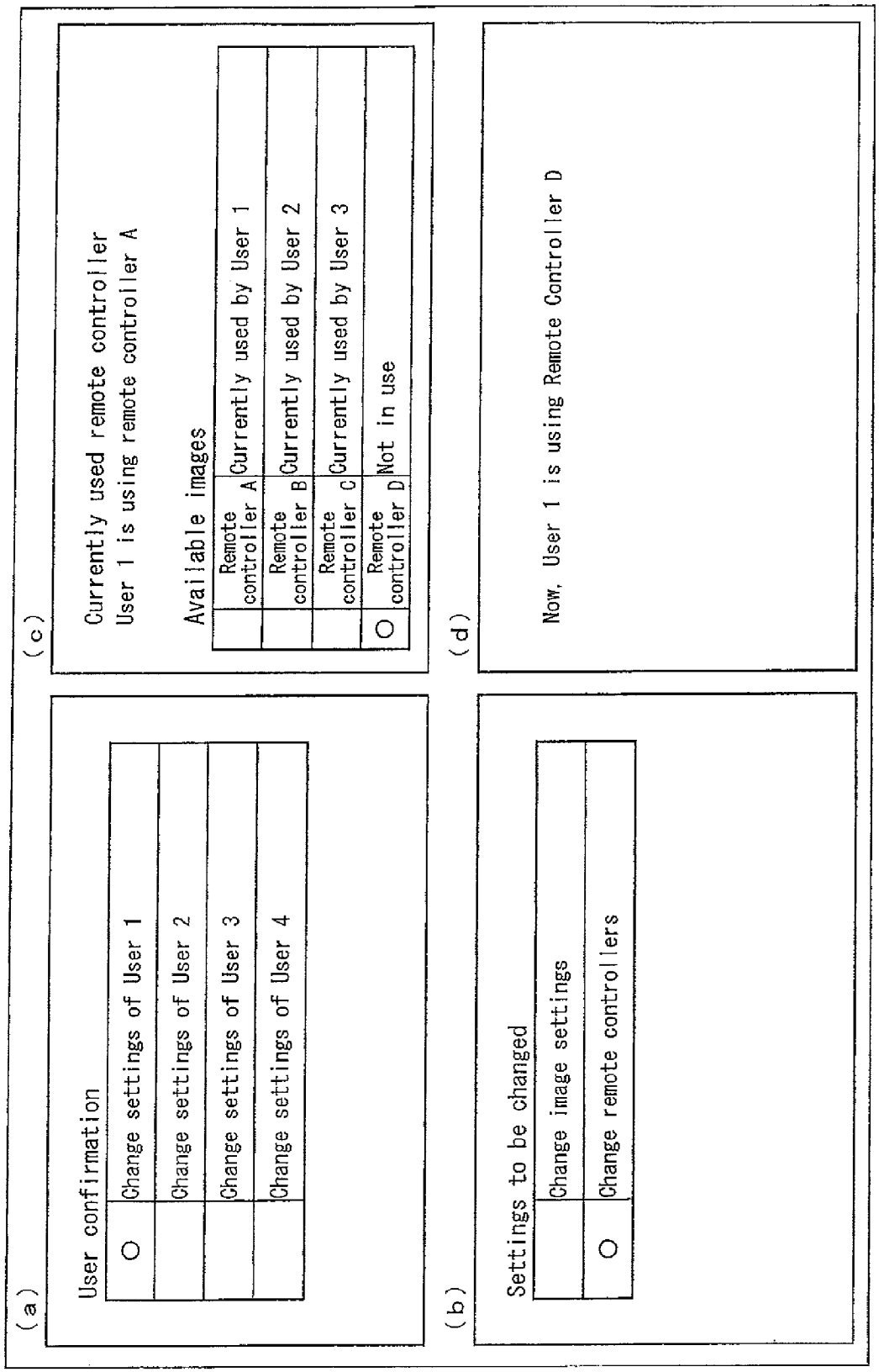
FIG. 11 is a view illustrating an example of how a viewer changes a currently-used remote controller to another remote controller. (a) of FIG. 11 is how the viewer is requested to confirm whose settings are going to be changed. (b) of FIG. 11 is a view illustrating how the viewer determines which settings to change. (c) of FIG. 11 is a view illustrating how the currently-used remote controller is changed from a remote controller A to a remote controller D. (d) of FIG. 11 is a view illustrating how the viewer is informed that the settings have been changed.

The following description discusses, with reference to FIG. 11, one example of how to change remote controllers used by a viewer. Note in FIG. 11 that a remote controller A is changed to a remote controller D.

The following description is based on the assumption that the display control section 12 (i) has obtained identification results (refer to Table 1) from the storage section 200 and (ii) is causing the display device 100 to display the identification results. Further, the function of "changing image settings" is allocated to for example the manual operation button A of the operation section 300. A screen shown in (a) of FIG. 11 is displayed on the display device 100 upon pressing of the manual operation button A by a viewer. The viewer 1 (also referred to as a "user 1") is currently using the remote controller A.

FIG. 11 illustrates one example of how a viewer changes a currently-used remote controller to another remote controller. (a) of FIG. 11 is a view illustrating how the viewer is requested to confirm whose settings are going to be changed. (b) of FIG. 11 is a view illustrating how the viewer 1 determines which settings to change. (c) of FIG. 11 is a view illustrating how the currently-used remote controller is changed from the remote controller A to the remote controller D. (d) of FIG. 11 is a view illustrating how the viewer 1 is informed that the settings have been changed.

First, the function of "changing image settings" is allocated to the manual operation button A of the operation section 300 in advance. Upon pressing of the manual operation button A by the viewer, a confirmation screen shown in (a) of FIG. 11 is displayed on the display device 100. As is the case with "Changing images", in a case where one (1) operation section 300 (i.e., one (1) manual operation button A) is shared by a plurality of viewers, the confirmation screen shown in (a) of FIG. 11 is preferably visible to all of the plurality of viewers (i.e., visible through all pairs of the image watching glasses 400). This enables the all of the plurality of viewers to know who is about to change image settings. Note here that the viewer 1 recognizes himself/herself as the user 1, because the viewer 1 has seen a corresponding one of the identification result, such as "You are User 1", which is displayed on the display device 100. Therefore, the viewer 1 selects an item "Change settings of User 1". The item is selected by (i) placing a "○" (unfilled circle) in a target position of a first column and then (ii) pressing an "OK" button (not illustrated) of the operation section 300. Upon the selection of the item, the screen shown in (b) of FIG. 11 is displayed on the display device 100. Note here that the displaying of the screen shown in (a) of FIG. 11, which screen requests a viewer to confirm whose settings are going to be changed, can be omitted. In this case, it is possible to employ a configuration in which the screen shown in (b) of FIG. 11 is displayed on the display device 100 upon pressing of the manual operation button A by the viewer. For example, in a case where a plurality of viewers are provided with respective operation sections 300 (i.e., respective manual operation buttons A), it is possible to employ a configuration in which, as described earlier and later, each of the plurality of viewers (hereinafter may be referred to as users) (i) identifies a controller corresponding to the each of the plurality of viewers and (ii) carries out operation with use of the controller. Using the controller corresponding to the each of the plurality of viewers means that the each of the plurality of viewers confirms that he/she is a certain user. For this reason, as is the case also with "Changing images", the displaying of the screen shown in (a) of FIG. 11 can be omitted.

According to (b) of FIG. 11, items "Change image settings" and "Change remote controllers" are displayed on the display device 100. Upon selection of the item "Change image settings", the screen described with reference to (b) of FIG. 9 is displayed. On the other hand, upon selection of the item "Change remote controllers", the screen described below with reference to (c) of FIG. 11 is displayed. The selection is carried out by (i) placing the "○" (unfilled circle) in a target position of a first column and then (ii) pressing the "OK" button (not illustrated) of the operation section 300. Upon the selection of the item "Change remote controllers", the screen shown in (c) of FIG. 11 is displayed on the display device 100.

Note here that the displaying of the screen shown in (b) of FIG. 11, which screen requests a viewer to confirm which setting is going to be changed, can be omitted. In a case where the displaying of the screen shown in (b) of FIG. 11 is omitted, it is possible to employ a configuration in which the screen shown in the later-described (c) of FIG. 11 is displayed on the display device 100 upon pressing of the manual operation button A by the viewer. Note that the items displayed on the display device 100 are not limited to those illustrated in (b) of FIG. 11, and another item can further be displayed. Further, a display format of the screen shown in (b) of FIG. 11 is a mere example, and therefore not limited to that exemplified in (b) of FIG. 11. Furthermore, the screens shown in (b) through (d) of FIG. 11 need to be visible at least to the user 1, who is about to change (or is changing) settings. A screen displayed to users other than the user 1, which users are not going to change settings, is not limited to those shown in (b) through (d) of FIG. 11, and therefore any other screen or image can be displayed to the users other than the user 1.

(c) of FIG. 11 illustrates a screen that is displayed on the display device 100 upon selection, by the viewer 1, of the item "Change remote controllers" in the screen shown in (b) of FIG. 11.

According to (c) of FIG. 11, information such as "Remote controller A (or B, C, or D)", "Currently used by User 1 (or 2 or 3)", and "Not in use" are displayed on the display device 100.

Since the viewer 1 wants to change the currently-used remote controller from the remote controller A to the remote controller D which is not in use, the viewer 1 selects the last line containing the information "Remote controller D" and "Not in use". That is, the viewer 1 place the "○" (unfilled circle) on the last line, and then presses the "OK" button (not illustrated) of the operation section 300. In this way, the viewer 1 can change the currently-used remote controller to the remote controller D.

After the remote controller currently used by the viewer 1 is changed to the remote controller D, the screen saying "Now, User 1 is using Remote Controller D" is displayed on the display device 100. This enables the viewer 1 to recognize that the settings have been changed successfully.

Note here that, before the settings are changed, the communication section 18 recognizes a signal from the remote controller A as corresponding to the shutter glasses 400A worn by the viewer 1. After the settings are changed, the communication section 18 recognizes a signal from the remote controller D as corresponding to the shutter glasses 400A. In other words, before the settings are changed, the remote controller A is used to control an image, which is displayed on the display device 100 in synchronization with operation of the shutter glasses 400A so as to be watched through the shutter glasses 400A. After the settings are changed, the remote controller D is used to control the image which is displayed on the display device 100 in synchronization with operation of the shutter glasses 400A so as to be watched through the shutter glasses 400A.

Through the procedures described above, the viewer 1 can change a remote controller, which corresponds to an image watched by the viewer 1, from the remote controller A to the remote controller D.

Figure 12:
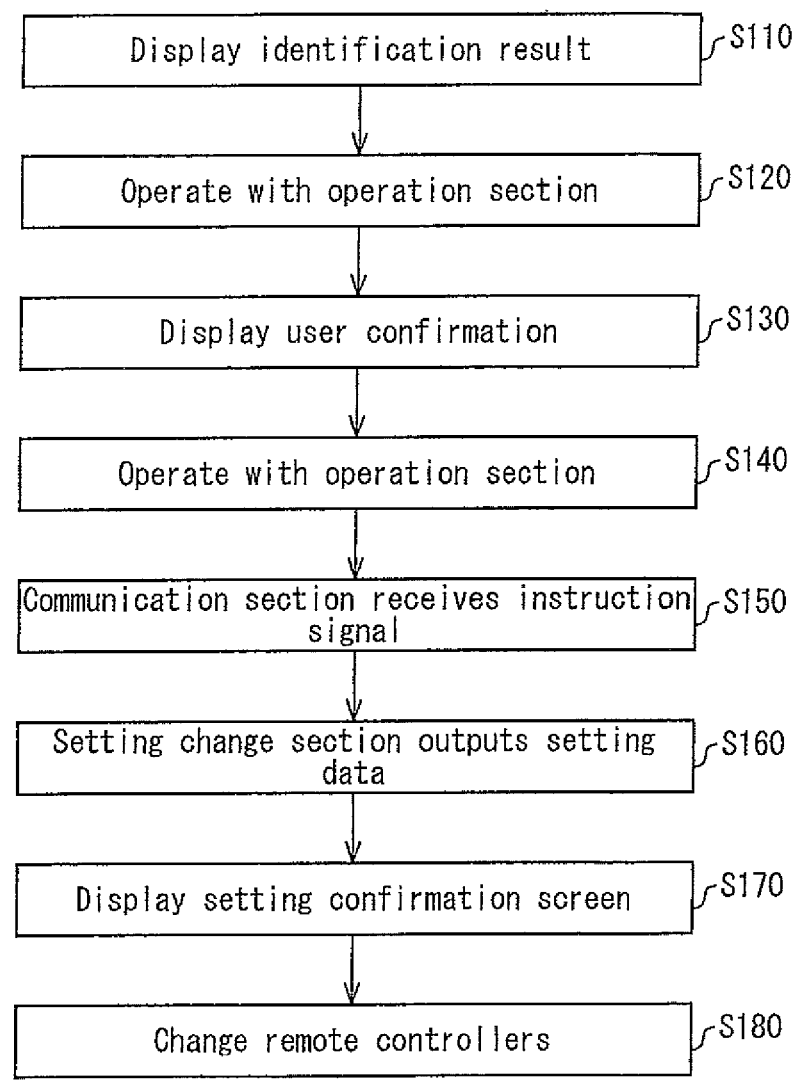
FIG. 12 is a flowchart illustrating how a viewer changes the currently-used remote controller from the remote controller A to the remote controller D.

Next, the following description discusses, with reference to FIG. 12, how the viewer 1 changes the currently-used remote controller from the remote controller A to the remote controller D. FIG. 12 is a flowchart illustrating how a viewer changes a currently-used remote controller from the remote controller A to the remote controller D.

In step S110, the display control section 12 obtains, from the storage section 200, an identification result (refer to Table 1) associated with an identification information item obtained by the identification information obtaining section 15. Then, the display control section 12 causes the display device 100 to display the identification result. This allows the viewer 1 to recognize himself/herself as the user 1.

In step S120, the viewer 1, who wants to change the currently-used remote controller to another remote controller, presses a button, to which the function of "changing image settings" is allocated, of the operation section 300.

In step S130, the communication section 18 receives a command, for changing settings, which is inputted by the viewer 1 via the operation section 300. Upon receipt of the command, the communication section 18 causes the display control section 12 to operate so that a screen requesting the viewer 1 to confirm whose settings are going to be changed (see (a) of FIG. 11) is displayed.

In step S140, the viewer 1 carries out, via the operation section 300, input operation in the screen shown in (a) of FIG. 11.

Upon the input operation by the viewer 1 in the screen shown in (a) of FIG. 11, the screen proceeds to the screen shown in (b) of FIG. 11, and then to the screen shown in (c) of FIG. 11. In the screens shown in (b) and (c) of FIG. 11, the viewer 1 carries out input operation via the operation section 300 in a similar way to that of the screen shown in (a) of FIG. 11. Note here that data corresponding to the screens shown in (a) through (c) of FIG. 11 can be stored in the storage section 200 in advance so that the display control section 12 obtains the data from the storage section 200.

In step S150, the communication section 18 receives an instruction signal that (i) is inputted by the viewer 1 via the operation section 300 and (ii) changes the currently-used remote controller from the remote controller A to the remote controller D. Then, the communication section 18 supplies, to the setting change section 19, a signal indicating (a) that the communication section 18 has received the instruction signal and (b) details of the instruction signal.

In step S160, upon receipt of the signal from the communication section 18, the setting change section 19 obtains, from the storage section 200, the data that (i) corresponds to the screen shown in (d) of FIG. 11 and (ii) is stored in the storage section 200 in advance. Then, the setting change section 19 supplies the data to the display control section 12.

In step S170, the display control section 12 causes the display device 100 to display the screen shown in (d) of FIG. 11. That is, the screen saying "Now, User 1 is using remote controller D" is displayed on the display device 100. This enables the viewer 1 to recognize that the settings have been changed successfully.

In step S180, the following occurs. That is, before the settings are changed, the communication section 18 recognizes a signal from the remote controller A as corresponding to the shutter glasses 400A worn by the viewer 1. After the settings are changed in step S180, the communication section 18 recognizes a signal from the remote controller D as corresponding to the shutter glasses 400A. In other words, after the settings are changed, the communication section 18 recognizes the signal from the remote controller D as corresponding to the image displayed on the display device 100 in synchronization with the operation of the shutter glasses 400A. This finishes the changing of the remote controllers used by the viewer 1. Note that step S180 can be either before or after step S170.

As described above, the employment of the image watching glasses identification device 30 makes it possible for a viewer to identify a certain pair of the shutter glasses 400, and thus to change remote controllers corresponding to the certain pair of the shutter glasses 400.

[Selection of Game Players]

According to the examples of application described with reference to FIGS. 9 and 11, image settings and controllers are changed in response to voluntary operation by a viewer.

Note, however, that an example of application described below is different from the above examples of application in that (i) switching of game players and (ii) control, of the control section 12 and the synchronization control section 13, which results from the switching of the game players are carried out not in response to the voluntary operation by the viewer but by a device. This is specifically described below.

The following description is based on the assumption that (i) a viewer 1 (hereinafter referred to as a "player 1") and a viewer 2 (hereinafter referred to as a "player 2") are playing a competitive game and (ii) the player 1 and the player 2 are wearing shutter glasses 400A and shutter glasses 400B, respectively. A gaming device on which the competitive game operates is provided outside the display device 100, and is connected with the display device 100 and with the image watching glasses identification device 10 (or 20 or 30). The player 1 and the player 2 are watching respective three-dimensional game images displayed on the display device 100. The following description discusses, with reference to FIG. 13, how the synchronization control section 13 and the shutter glasses 400A and the shutter glasses 400B operate.

FIG. 13 illustrates how (i) timings at which images A through D are displayed on the display device 100 and (ii) timings at which a shutter for a right eye or a shutter for a left eye of each pair of the shutter glasses 400A and the shutter glasses 400B is opened and closed are synchronized with each other. (a) of FIG. 13 illustrates synchronization obtained before the players are switched. (b) of FIG. 13 illustrates synchronization obtained after the players are switched.

In FIG. 13, the letter "Y" denotes that an image is displayed on the display device 100, whereas the letter "N" denotes that the image is not displayed on the display device 100. Further, the images A and C are images, for a right eye, each of which constitutes a three-dimensional image. The images B and D are images, for a left eye, each of which constitutes the three-dimensional image.

First, the following description discusses a case where the players 1 and 2 are not yet switched with each other. That is, the following description discusses, with reference to (a) of FIG. 13, (i) the timings at which the images A through D are displayed on the display device 100 and (ii) the timings at which the shutter for the right eye or the shutter for the left eye of each pair of the shutter glasses 400A and the shutter glasses 400B is opened and closed.

The images A through D are sequentially displayed in this order on the display device 100. The images A and B are an image for a right eye and an image for a left eye, respectively, and make up a three-dimensional image. The images A and B are displayed to the player 1 wearing the shutter glasses 400A. On the other hand, the images C and D are an image for a right eye and an image for a left eye, respectively, and make up a three-dimensional image. The images C and D are displayed to the player 2 wearing the shutter glasses 400B.

The synchronization control section 13 carries out synchronous control such that, while the image A is displayed on the display device 100, (i) the shutter for the right eye of the shutter glasses 400A is opened and (ii) the shutter for the left eye of the shutter glasses 400A and the shutter for the right eye and the shutter for the left eye of the shutter glasses 400B are closed. Further, the synchronization control section 13 carries out synchronous control such that, while the image B is displayed on the display device 100, (a) the shutter for the left eye of the shutter glasses 400A is opened and (b) the shutter or the right eye of the shutter glasses 400A and the shutter for the right eye and the shutter for the left eye of the shutter glasses 400B are closed. Furthermore, the synchronization control section 13 carries out synchronous control such that, while the image C is displayed on the display device 100, (I) the shutter for the right eye of the shutter glasses 400B is opened and (II) the shutter for the left eye of the shutter glasses 400B and the shutter for the right eye and the shutter for the left eye of the shutter glasses 400A are closed. Moreover, the synchronization control section 13 carries out synchronous control such that, while the image D is displayed on the display device 100, (A) the shutter for the left eye of the shutter glasses 400B is opened and (B) the shutter for the right eye of the shutter glasses 400B and the shutter for the right eye and the shutter for the left eye of the shutter glasses 400A are closed. That is, the images C and D are visible only to the player 2 and are not visible to the player 1, whereas the images A and B are visible only to the player 1 and are not visible to the player 2.

Under such circumstances, assume that, while the competitive game is proceeding, the images visible to the player 1 and the images visible to the player 2 are switched with each other (i.e., the players 1 and 2 are switched with each other) in response to certain operation by any of the players 1 and 2. Note here that the players 1 and 2 are switched with each other by a program which is installed in the gaming device and causes the competitive game to operate. The program carries out the switching of the players 1 and 2 in response to certain operation by any of the players 1 and 2.

The gaming device is connected with the display device 100 and with the image watching glasses identification device 10 (or 20 or 30). The gaming device supplies, to the control section 11 or the command receiving section 17 of the image watching glasses identification device 10 (or 20 or 30), a signal for switching the players 1 and 2 with each other (such a signal is hereinafter referred to as a "switching signal"). Then, the control section 11 carries out, in response to the switching signal, control illustrated in (b) of FIG. 3.

(b) of FIG. 13 illustrates a case where the players 1 and 2 are already switched with each other. (b) of FIG. 13 illustrates (i) the timings at which the images A through D are displayed on the display device 100 and (ii) the timings at which the shutter for the right eye or the shutter for the left eye of each pair of the shutter glasses 400A and the shutter glasses 400b is opened and closed.

According to (b) of FIG. 13, the images A through D are sequentially displayed in this order on the display device 100. The synchronization control section 13 carries out synchronization control such that, while the image A is displayed on the display device 100, (i) the shutter for the right eye of the shutter glasses 400B is opened and (ii) the shutter for the left eye of the shutter glasses 400B and the shutter for the right eye and the shutter for the left eye of the shutter glasses 400A are closed. Further, the synchronization control section 13 carries out synchronization control such that, while the image B is displayed on the display device 100, (a) the shutter for the left eye of the shutter glasses 400B is opened and (b) the shutter for the right eye of the shutter glasses 400B and the shutter for the right eye and the shutter for the left eye of the shutter glasses 400A are closed. Furthermore, the synchronization control section 13 carries out synchronization control such that, while the image C is displayed on the display device 100, (I) the shutter for the right eye of the shutter glasses 400A is opened and (II) the shutter for the left eye of the shutter glasses 400A and the shutter for the right eye and the shutter for the left eye of the shutter glasses 400A are closed. Moreover, the synchronization control section 13 carries out synchronization control such that, while the image D is displayed on the display device 100, (A) the shutter for the left eye of the shutter glasses 400A is opened and (B) the shutter for the right eye and the shutter for the left eye of the shutter glasses 400B are closed. That is, the images A and B are visible only to the player 2 and are not visible to the player 1, whereas the images C and D are visible only to the player 1 and are not visible to the player 2.

As described above, (i) the program installed in the gaming device and (ii) the image watching glasses identification device 10 (or 20 or 30) operate in cooperation with each other. This allows for the switching of the images visible to the player 1 and the images visible to the player 2. That is, each of the players 1 and 2 can enjoy two different worlds (i.e., two different viewpoints) within one (1) game. At the same time, the image watching glasses identification device 10 (or 20 or 30) causes each of the players 1 and 2 to recognize an identification information item (identification result) corresponding to the each of the players 1 and 2. Accordingly, it is also possible to achieve a configuration in which each of the players 1 and 2 identifies a currently-used controller, and thus achieve an advantageous effect of this configuration.

Since the image watching glasses identification device 10 (or 20 or 30) and the program installed in the game machine operate in cooperation with each other like above, it is possible to achieve a configuration in which (i) switching of players and (ii) control, of the display control section 12 and the synchronization control section 13, which results from the switching of the players are carried out only by the device without voluntary operation by a viewer.

Further, the image watching glasses identification device 10 (or 20 or 30) is capable, by operating in cooperation with the program installed in the gaming device, of achieving the following configuration.

That is, in a case where (i) there is another person (hereinafter referred to as an "observer") who is not a player or (ii) one of the players can be changed to the observer by certain operation by any of the players, all of the images (i.e., the images A through D) are made visible to the observer.

[Case where Observer Who is not Player Participates]

The following description discusses a configuration in which, in a case where an observer wears the shutter glasses 400C, an additional image to be watched through the shutter glasses 400C is displayed on the display device 100. In a case where the additional image is a three-dimensional image, for example, an image E and an image F are displayed on the display device 100 (note that, in a case where the additional image is a two-dimensional image, the image E is displayed on the display device 100). The images A, B, C, D, E, and F are sequentially displayed on the display device 100 for example in order of A, B, C, D, E, F, A, B, . . . and so on. At the same time, the timings at which the shutters of each pair of the shutter glasses 400A, the shutter glasses 400B, and the shutter glasses 400C are opened and closed correspond to timings at which the images A, B, C, D, E, and F are displayed. Specifically, while the image E or the image F is displayed, the shutter for the right eye and the shutter for the left eye of each pair of the shutter glasses 400A and the shutter glasses 400B are closed. Therefore, the images E and F are not visible to the players 1 and 2.

On the other hand, while the image A, B, C, or D is displayed, the shutter for the right eye and the shutter for the left eye of the shutter glasses 400C are closed. Therefore, the images A, B, C, and D are not visible to the observer. Instead, the shutter for the right eye of the shutter glasses 400C is opened while the image E is displayed, and the shutter for the left eye of the shutter glasses 400C is opened while the image F is displayed. Therefore, the observer can see the image E and the image F with the right eye and the left eye, respectively.

The images E and F, which are visible to the observer, can be images that make up one (1) three-dimensional image containing two reduced three-dimensional images. One of the two reduced three-dimensional images is made from the images A and B, and the other one of the two reduced three-dimensional images is made from the images C and D. Alternatively, the images E and F can be images that make up a three-dimensional image totally different from the images A through D. This three-dimensional image is for example, but not limited to, an image viewing game characters of the players 1 and 2 from another viewpoint.

[Case where Player Becomes Observer]

The following description discusses a configuration in which, for example in a case where the player 1 becomes an observer, the observer cannot see the images A and B anymore and can instead see the images E and F. The configuration achieves not only a simple operation in which an observer participates (refer to the foregoing "Case where observer who is not player participates"), but also a complicated operation in which for example a player becomes an observer.

This configuration is achieved by (i) the program installed in the gaming device and (ii) the image watching glasses identification device 10 (or 20 or 30) operating in cooperation with each other. After the player becomes the observer, the display control section 12 operates so that the images A and B are changed to the images E and F. Further, the synchronization control section 13 synchronizes (a) the timings at which the images E and F are displayed and (b) the timings at which a shutter for a right eye and a shutter for a left eye of a corresponding pair of the shutter glasses 400 are opened and closed. Therefore, detailed descriptions therefor are omitted here.

Since the image watching glasses identification device 10 (or 20 or 30) and the program installed in the gaming device operate in cooperation with each other as described earlier, it is possible to achieve a configuration in which (i) the switching of players and (ii) control, of the display control section 12 and the synchronization control section 13, which results from the switching of the players are carried out only by the device without voluntary operation by a viewer.

Further, since (i) the program installed in the gaming device and (ii) the image watching glasses identification device 10 (or 20 or 30) operate in cooperation with each other, it is also possible to achieve a variety of complicated configurations. For example, it is possible not only to switch players, but also, in response to certain operation by a player, (a) to turn an image upside down or (b) for the player to take over another player's game character so that the image visible to the player is switched with an image visible to the another player.

[Shutter Glasses 400]

Figure 14:
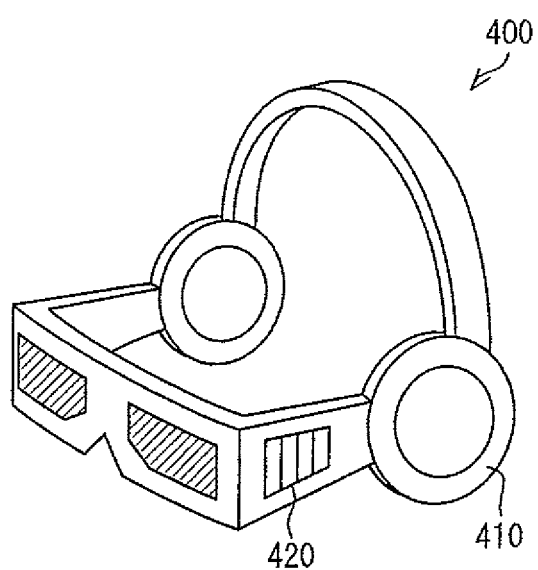
FIG. 14 is a view schematically illustrating how a pair of shutter glasses is configured.

The following description further discusses, with reference to FIG. 14, how the shutter glasses 400 are configured. FIG. 14 is a schematic view illustrating how a pair of the shutter glasses 400 are configured.

As illustrated in FIG. 14, the pair of the shutter glasses 400 further includes speakers 410 and a notifying section (notifying means) 420.

The speakers 410 output a sound therefrom. In a case where the image watching glasses identification device 30 includes the audio control section 14 that supplies, to the speakers 410 of the pair of the shutter glasses 400, audio data corresponding to a sound accompanied by an image displayed on the display device 100, the audio control section 14 supplies the audio data to the pair of the shutter glasses 400. As a result, the sound is outputted from the pair of the shutter glasses 400.

Further, the audio control section 14 can carry out control such that, in a case where a plurality of viewers are watching respective different images, each of the plurality of viewers hears through corresponding speakers 410 a sound accompanied by an image that corresponds to a pair of the shutter glasses 400 worn by the each of the plurality of viewers.

According to FIG. 14, the speakers 410 have shapes that cover a right and left ears of a viewer, and are connected with each other via a connection part having a form of arc. The pair of the shutter glasses 400 is configured such that, while the viewer is wearing the pair of the shutter glasses 400, the connection part makes contact with a top of a head of the viewer, thereby supporting weight of the speakers 410. Note, however, that the shapes and configuration of the speakers 410 illustrated in FIG. 14 are mere examples, and therefore not limited to those illustrated in FIG. 14.

The notifying section 420 obtains, from the identification information obtaining section 15, an identification result associated with an identification information item. Then, the notifying section 420 notifies the identification result. Note here that the identification result can be obtained by the notifying section 420 from the identification information obtaining section 15, or via the communication section 18.

Alternatively, the notifying section 420 obtains, from the display control section 12, an image type information item regarding a type of an available image. Then, the notifying section 420 notifies the type of the available image indicated by the image type information item. Note here that the image type information item can be obtained by the notifying section 420 from the display control section 12, or obtained via the communication section 18.

According to FIG. 14, the notifying section 420 is provided on a side surface of a frame of the pair of the shutter glasses 400, and is divided into four regions. The notifying section 420 can be configured such that each of the four regions individually lights or blinks, for example. An identification information item for identifying the pair of the shutter glasses 400 can be represented by (i) which one of the four regions lights or blinks, (ii) how each of the four regions lights or blinks, or (iii) in which color each of the four regions lights or blinks (e.g., white, red, blue, or green).

Alternatively, the notifying section 420 can be configured such that an image type information item regarding types of image is represented by which one of the four regions lights or blinks. According to this configuration, it is possible to notify a viewer of the image type information item. Specifically, for example, in a case where a rightmost region lights, the viewer can watch a movie through the pair of the shutter glasses 400. In a case where a leftmost region lights, the viewer can watch a news program through the pair of the shutter glasses 400.

This makes it possible also to achieve the following advantageous effects.

Specifically, in a case where an identification number, a label, or the like is directly printed on or attached to the pair of the shutter glasses 400, the identification number etc. may fade as a result of repetitive use of the pair of the shutter glasses 400. Further, a viewer wearing the pair of the shutter glasses 400 cannot check the identification number etc. printed on or attached to the pair of the shutter glasses 400. In order to check the identification number etc., the viewer needs to take off the pair of the shutter glasses 400. Furthermore, in a case of using the pair of the shutter glasses 400 for another device, a different identification number (identification name) may be allocated to the pair of the shutter glasses 400 by the another device. If this is the case, the viewer needs to again check the new identification number etc. allocated by the another device. For this reason, the identification number etc. directly printed on or attached to the pair of the shutter glasses 400 rather makes the viewer confused, in a case where the another device allocates an identification number etc. different from that directly printed on or attached to the shutter glasses 400.

In this regard, the pair of the shutter glasses 400 includes the notifying section 420. This makes it possible to omit a process of printing or attaching the identification number, the label, or the like on or to the pair of the shutter glasses 400. In addition, it is possible to prevent the identification number etc. from being faded as a result of repetitive use of the pair of the shutter glasses 400.

Further, while the viewer is not wearing the pair of the shutter glasses 400, the notifying section 420 makes it possible to directly notify the viewer of the identification result without causing the viewer to check the display device 100. While the viewer is wearing the pair of the shutter glasses 400, the display device 100 displays the identification result so that the viewer recognizes the identification result from the display. That is, it is possible to notify the viewer of the identification result before and after the viewer wears the pair of the shutter glasses 400. As such, the viewer does not need to take off and re-wear the pair of the shutter glasses 400 so as to check the identification result.

Further, according to the present embodiment, there is no possibility of confusion even in a case of using the pair of the shutter glasses 400 for another device. This is because the pair of the shutter glasses 400 is capable of notifying the identification number that differs depending on the device.

As described so far, the shutter glasses 400 achieve a variety of advantageous effects.

Note here that the shape and configuration of the notifying section 420 illustrated in FIG. 14 are mere examples, and can be any of a variety of shapes and configurations. For example, the notifying section 420 can be a liquid crystal display section of a liquid crystal shutter. Alternatively, the notifying section 420 can be constituted by characters displayed on a liquid crystal display panel. Further, although not illustrated, the shutter glasses 400 are preferably connected with the display device 100 (i.e., with the image watching glasses identification device 10, 20, or 30) with or without wires. In a case where the shutter glasses 400 are connected with the display device 100, the shutter glasses 400 include a processing circuit etc. required for the wire connection or the wireless connection. Note here that a conventional circuit can be used as the processing circuit etc. Therefore, specific descriptions for the processing circuit etc. are omitted here.

The notifying section 420 is not limited to the configuration described above, and can be achieved in the following manner. Specifically, the notifying section 420 can include a constituent visible and changeable, such as a number, a character, a color, a shape, a symbol, a name, or the like. For example, assume that (i) a pair of the shutter glasses 400 is used for another image watching glasses identification device and (ii) the identification number allocated to the pair of the shutter glasses 400 differs depending on the image watching glasses identification device. In a case where the notifying section 420 is configured like above, a viewer can change the constituent (e.g., the number or the character) according to the identification result displayed on the display device 100. This enables, from next time the viewer wears the pair of the shutter glasses 400, the viewer to correctly and quickly recognize the identification information item (identification result), which depends on the image watching glasses identification device. This is because the viewer can recognize the identification information item from the constituent, of the notifying section 420, which has been changed by the viewer.

As described so far, the notifying section 420 can have a variety of configurations.

ADVANTAGEOUS EFFECTS

The following description discusses advantageous effects obtainable through the image watching glasses identification device 10 (or 20 or 30) etc.

An image watching glasses identification device 10 (or 20 or 30) is an image watching glasses identification device 10 (or 20 or 30) for identifying a pair of shutter glasses 400 through which to watch an image displayed on a display device 100, the image watching glasses identification device 10 (or 20 or 30) including: an identification information obtaining section 15 for obtaining an identification information item for identifying the pair of shutter glasses 400; and a display control section 12 for causing the display device 100 to display an identification result associated with the identification information item obtained by the identification information obtaining section 15.

An image watching system 1 (or 2 or 3) includes: a display device 100; and a pair of shutter glasses 400 through which to watch an image displayed on the display device 100, the image watching system 1 (or 2 or 3), further including: an image watching glasses identification device 10 (or 20 or 30) including: an identification information obtaining section 15 for obtaining an identification information item for identifying the pair of shutter glasses 400; and a display controlling means 12 for causing the display device 100 to display an identification result associated with the identification information item obtained by the identification information obtaining means 15.

A pair of shutter glasses 400 is for use in an image watching system 1 (or 2 or 3) that includes: a display device 100; and the pair of shutter glasses 400 through which to watch an image displayed on the display device 100, the image watching system 1 (or 2 or 3), further including: an image watching glasses identification device 10 (or 20 or 30) including: an identification information obtaining section 15 for obtaining an identification information item for identifying the pair of shutter glasses 400; and a display control section 12 for causing the display device 100 to display an identification result associated with the identification information item obtained by the identification information obtaining section 15, the identification result indicating that a viewer uses the pair of shutter glasses 400.

In recent years, research and development for an image watching method etc. have been carried out not only for a two-dimensional image but also for a three-dimensional image. According to one example of such a watching method, a plurality of viewers are wearing respective pairs of image watching glasses, and each of the plurality of viewers watches a desired one of images displayed on an identical display device.

Note however that, in a case where (i) the desired image and an unwanted image(s) are sequentially displayed on the identical display device and (ii) only the desired image is to be watched by a pair of image watching glasses operating in synchronization with the image display, each of the plurality of viewers cannot know to which image a pair of image watching glasses worn by the each of the plurality of viewers corresponds. Therefore, each of the plurality of viewers may not be able to watch the desired image through a certain pair of image watching glasses. Further, since each of the plurality of viewers cannot identify the pair of image watching glasses worn by the each of the plurality of viewers, it is not possible to achieve an evolutionary watching method in which the each of the plurality of viewers identifies a specified pair of image watching glasses and thus can change settings of an image to which the specified pair of image watching glasses corresponds.

Under such circumstances, in order to achieve the foregoing evolutionary watching method, it is very necessary to cause each of the plurality of viewers to recognize the identification result for identifying the pair of image watching glasses worn by the each of the plurality of viewers.

In this regard, according to the present invention, the identification information obtaining section 15 obtains the identification information item (e.g., an information item of "Glasses 1") for identifying a specified pair of the shutter glasses 400. Then, the display control section 12 causes the display device 100 to display the identification result (e.g., an information item of "You are using Glasses 1") associated with the identification information item of "Glasses 1". This enables each of the plurality of viewers to recognize the identification result displayed on the display device 100, and thus recognize that the pair of shutter glasses 400 worn by the each of the plurality of viewers is the specified pair of shutter glasses 400 (e.g., Grasses 1).

In this way, each of the plurality of viewers can identify the pair of shutter glasses 400 worn by the each of the plurality of viewers. Accordingly, it is possible also to achieve an evolutionary watching method in which each of the plurality of viewers identifies the pair of shutter glasses 400 worn by the each of the plurality of viewers and thus can change the settings of the image that the pair of shutter glasses 400 corresponds. One example of such an evolutionary watching method is a method in which (i) timings at which shutters of the pair of shutter glasses 400 are opened and closed are fixed and (ii) a desired image is displayed on the display device 100 at timings at which the shutters are opened. Another example of the evolutionary watching method is a method in which the timings at which the shutters of the pair of shutter glasses 400 are opened and closed are adjusted so that each of the plurality of viewers watches only a desired one of images sequentially displayed on the display device 100.

Further, the present invention encompasses an image watching system 1 (or 2 or 3) including: a display device 100; a pair of shutter glasses 400 through which to watch an image displayed on the display device 100; and an image watching glasses identification device 10 (or 20 or 30). Furthermore, the present invention encompasses a pair of shutter glasses 400 for use in the image watching system 1 (or 2 or 3).

The image watching glasses identification device 10 (or 20 or 30) can be configured such that the identification information obtaining section 15 is capable of receiving the identification information item via communication with the pair of shutter glasses 400.

According to the configuration, it is possible for the identification information obtaining section 15 to easily obtain the identification information item. Specifically, since the identification information obtaining section 15 is capable of receiving the identification information item from the pair of shutter glasses 400, it is not necessary, for the purpose of obtaining the identification information item, to cause a viewer to input the identification information item via an operation section 300 such as a keyboard. Accordingly, it is possible for the identification information obtaining section 15 to obtain the identification information item quickly and surely.

The communication between the image watching glasses identification device 10 (or 20 or 30) and the pair of shutter glasses 400 can either be wireless communication or wired communication. Note however that, since the wired communication causes restrictions on a watching space, movement of viewers, and/or the like, the wireless communication is preferable. The wireless communication, such as for example infrared communication and Bluetooth, does not cause such restrictions.

The image watching glasses identification device 10 (or 20 or 30) can further include: a command receiving section 17 for receiving a command inputted by a viewer via an operation section 300, the command being for changing a first setting of the image to be displayed on the display device to a second setting, the command receiving section 17 supplying, to the display control section 12, setting information regarding the second setting, and the display control section 12 causing the display device 100 to display the image according to the setting information.

According to the configuration, the command receiving section 17 receives the command for changing the first setting of the image to the second setting, and supplies, to the display control section 12, the setting information regarding the second setting. Then, the display control section 12 causes the display device 100 to display the image corresponding to the setting information.

That is, since the image is displayed on the display device 100 according to the setting information, it is possible to achieve an evolutionary method, in which the viewer identifies the pair of shutter glasses 400 worn by the viewer and thus can voluntarily change settings of the image that the pair of shutter glasses 400 corresponds.

The change of the first setting to the second setting of the image can be any change of settings regarding the image. For example, it is possible to change an image to another image (e.g., change an image 1 to an image 2), change image qualities (e.g., change brightness from bright to dark), or the like. Further, a setting display can be displayed on the display device 100 by a conventional method. Furthermore, input operation on the setting display can be carried out by a conventional method.

The present invention encompasses also an image watching glasses identification program for use in an image watching glasses identification device 10 (or 20 or 30) for identifying a pair of shutter glasses 400 through which to watch an image displayed on a display device 100, the image watching glasses identification device 10 (or 20 or 30) including: an identification information obtaining section 15 for obtaining an identification information item for identifying the pair of shutter glasses 400; and a display controlling means 12 for causing the display device 100 to display an identification result associated with the identification information item obtained by the identification information obtaining section 15, the image watching glasses identification program causing a computer to execute the steps of: receiving a command inputted by a viewer via an operation section 300, the command being for changing a first setting of the image displayed on the display device 100 to a second setting; supplying setting information to the display control section 12, the setting information regarding the second setting; and causing the display control section 12 to cause the display device 100 to display an image corresponding to the setting information.

The image watching glasses identification device 10 (or 20 or 30) can further include: a synchronization control section 13 for, in a case where the pair of shutter glasses 400 includes a shutter for a right eye and a shutter for a left eye each of which is capable of switching between whether the image displayed on the display device 100 is viewable or unviewable for a viewer, synchronizing (a) a timing at which at least one of the shutter for the right eye and the shutter for the left eye is opened and (b) a timing at which the display control section 12 causes the display device 100 to display the identification result.

According to the configuration, the pair of shutter glasses 400 includes the shutter for the right eye and the shutter for the left eye each of which is capable of switching between whether the image displayed on the display device 100 is viewable or unviewable for the viewer.

Further, the image watching glasses identification device 10 (or 20 or 30) includes the synchronization control section 13, which synchronizes (a) the timing at which at least one of the shutter for the right eye and the shutter for the left eye is opened and (b) the timing at which the display control section 12 causes the display device 100 to display the identification result.

According to this configuration, the identification result is displayed on the display device 100 at the timing at which at least one of the shutter for the right eye and the shutter for the left eye is opened. This ensures that the viewer recognizes the identification result.

Since the image watching glasses identification device 10 (or 20 or 30) includes the synchronization control section 13, the image watching glasses identification device 10 (or 20 or 30) is capable of causing the viewer to surely recognize the identification result even in a case where the pair of shutter glasses 400 includes the shutter for the right eye and the shutter for the left eye.

Note that the pair of shutter glasses 400 is constituted by for example liquid crystal shutters.

The image watching glasses identification device 10 (or 20 or 30) can further include: a command receiving section 17 for receiving a command inputted by the viewer via an operation section 300, the command being for changing a first setting of the image to be displayed on the display device to a second setting, the command receiving section 17 supplying, to the synchronization control section 13, setting information regarding the second setting, and the synchronization control section 13 synchronizing, in accordance with the setting information, (i) a timing at which the image is displayed on the display device 100 according to the setting information and (ii) the timing at which the shutter for the right eye and the shutter for the left eye are opened and closed.

According to the configuration, the command receiving section 17 receives the command for changing the first setting of the image to the second setting, and then supplies, to the display control section 12, the setting information regarding the second setting. Then, the display control section 12 causes the display device 100 to display the image according to the setting information. Further, the image watching glasses identification device 10 (or 20 or 30) includes the synchronization control section 13, which synchronizes, in accordance with the setting information regarding the second setting, (i) the timing at which the image corresponding the setting information is displayed on the display device 100 and (ii) the timing at which at least one of the shutter for the right eye and the shutter for the left eye is opened.

According to this configuration, the image watching glasses identification device 10 (or 20 or 30) is configured such that the image corresponding to the second setting, to which the first setting is changed by the viewer, is displayed on the display device 100 in synchronization with the opening and closing of the shutters for the right and left eyes. Accordingly, it is possible to, even in a case where the pair of shutter glasses 400 includes the shutter for the right eye and the shutter for the left eye, achieve an evolutionary watching method in which the viewer identifies the pair of shutter glasses 400 worn by the viewer and thus can voluntarily change settings of the image that the pair of shutter glasses 400 corresponds.

The image watching glasses identification device 10 (or 20 or 30) can be configured such that: the image displayed on the display device 100 includes an image for a right eye and an image for a left eye, each of which images can be a constituent of a three-dimensional image; and the synchronization control section 13 synchronizes (i) a timing at which the image for the right eye is displayed on the display device 100 and (ii) a timing at which the shutter for the right eye is opened and the shutter for the left eye is closed, and synchronizes (a) a timing at which the image for the left eye is displayed on the display device 100 and (b) a timing at which the shutter for the right eye is closed and the shutter for the left eye is opened.

According to the configuration, the image for the right eye and the image for the left eye, each of which images can be the constituent of the three-dimensional image, are displayed on the display device 100.

Under such circumstances, the synchronization control section 13 (i) causes the shutter for the right eye to be opened and the shutter for the left eye to be closed while the image for the right eye is displayed on the display device 100, and (ii) causes the shutter for the right eye to be closed and the shutter for the left eye to be opened while the image for the left eye is displayed on the display device 100.

According to this configuration, the image watching glasses identification device 10 (or 20 or 30) includes the synchronization control section 13. This makes it possible for the viewer, who is wearing the pair of shutter glasses 400 including the shutter for the right eye and the shutter for the left eye, to watch, even in a case where the image displayed on the display device 100 includes the image for the right eye and the image for the left eye each of which images can be a constituent of the three-dimensional image, the images making up the three-dimensional image. Further, it is possible for the viewer to recognize, from the display of the display device 100, the identification result for identifying the pair of shutter glasses 400 worn by the viewer.

Accordingly, the image watching glasses identification device 10 (or 20 or 30) makes it possible to perform the display operation in such a manner that the images making up the three-dimensional image are displayed together with the identification result with respect to the viewer, even in a case where the image displayed on the display device 100 includes the image for the right eye and the image for the left eye each of which images can be a constituent of the three-dimensional image.

The image watching glasses identification device 10 (or 20 or 30) can be configured such that, in a case where a number of the identification information item obtained by the identification information obtaining section 15 is two or more, the display control section 12 causes the display device 100 to perform the display operation in such a manner that each of identification results associated with the respective two or more identification information items is displayed together with an image to be watched through a pair of shutter glasses 400 corresponding to the identification information item.

According to the configuration, the display control section 12 causes the display device 100 to perform the display operation in such a manner that each of the identification results associated with the respective two or more identification information items is displayed together with the image to be watched through the pair of shutter glasses 400 corresponding to the identification information item, even in a case where a plurality of viewers are wearing the respective pairs of shutter glasses 400.

According to this configuration, each of the plurality of viewers can identify the pair of shutter glasses 400 worn by the each of the plurality of viewers. This makes it possible also to achieve an evolutionary watching method in which each of the plurality of viewers identifies the pair of shutter glasses 400 worn by the each of the plurality of viewers and thus can change settings of the mage that the pair of shutter glasses 400 corresponds.

The image watching glasses identification device 10 (or 20 or 30) can be configured such that, in a case where a number of the identification information item obtained by the identification information obtaining section 15 is two or more, the synchronization control section 13 synchronizes, for each of pairs of shutter glasses 400 corresponding to the respective two or more identification information items, (i) the timing at which at least one of the shutter for the right eye and the shutter for the left eye is opened and (ii) the timing at which the display control section 12 causes the display device to display the identification result associated with the identification information item.

Even in a case where a plurality of viewers are wearing respective pairs of shutter glasses 400, the identification information obtaining section 15 is capable of obtaining two or more identification information items corresponding to the respective pairs of shutter glasses 400. Under such circumstances, the synchronization control section 13 synchronizes, for each of the pairs of shutter glasses 400 corresponding to the respective two or more identification information items, (i) the timing at which at least one of the shutter for the right eye and the shutter for the left eye is opened and (ii) the timing at which the display control section 12 causes the display device 100 to display the identification result associated with the identification information item.

According to this configuration, the identification result is displayed on the display device 100 at the timing at which at least one of the shutter for the right eye and the shutter for the left eye is opened. Accordingly, each of the plurality of viewers can surely recognize the identification result.

The image watching glasses identification device 10 (or 20 or 30) can further include: a glasses in-use information obtaining section 16 for obtaining an in-use information item which indicates that the pair of shutter glasses 400 is in use, the display control section 12 causing, upon receipt of the in-use information item obtained by the glasses in-use information obtaining section 16, the display device 100 to display the image to be watched through the pair of shutter glasses 400.

According to the configuration, it is not necessary to cause the display device 100 to always display the image to be watched through the pair of shutter glasses 400. This is because the display control section 12 causes the display device 100 to display the image upon receipt of the in-use information obtained by the glasses in-use information obtaining section 16.

This achieves an advantage that qualities of images watched through pairs of shutter glasses 400 are improved, because the images are prevented from being unnecessarily displayed. Specifically, assume that (i) the number of the pairs of shutter glasses 400 is four and (ii) four different images are watched through the respective four pairs of shutter glasses 400. In this case, the display device 100 is supposed to time-divisionally display the four different images corresponding to the respective four pairs of the shutter glasses 400. However, according to the above configuration, only two of the four different images are time-divisionally displayed on the display device 100 in a case where two of the four pairs of shutter glasses 400 are not in use. That is, the number of images time-divisionally displayed on the display device 100 is reduced from four to two. This makes it possible for each of the plurality of viewers to watch a corresponding image for twice as long a period of time. Accordingly, it is possible to achieve an advantage that an image quality such as brightness, smoothness, or the like of the corresponding image is improved. A change of the number of images time-divisionally displayed affects brightness, of the images, which is perceived by the plurality of viewers. That is, the change of the number of images time-divisionally displayed affects brightness obtained when the images are watched through the image watching glasses. In a case where a viewer wants certain brightness for environmental reasons, the viewer just needs to change luminance of a display. Even in that case, the reduction of the number of the images time-divisionally displayed makes it possible for the viewer to watch a corresponding image with improved smoothness.

The glasses in-use information obtaining section 16 can obtain, from the pair of shutter glasses 400, the in-use information item via wired communication or wireless communication between the glasses in-use information obtaining section 16 and the pair of shutter glasses 400. Alternatively, the glasses in-use information obtaining section 16 can obtain the in-use information item through input operation by the viewer via the operation section 30. Further, the pair of shutter glasses 400 can be configured such that it (i) includes an ON switch or the like and (ii) inputs the in-use information item into the glasses in-use information obtaining section 16 upon pressing of the ON switch. A method of generating the in-use information item is not limited to a particular kind.

The image watching glasses identification device 10 (or 20 or 30) can be configured such that the pair of shutter glasses 400 includes a speaker for outputting a sound, and the image watching glasses identification device can further include: an audio control section for supplying, to the speaker of the pair of shutter glasses 400, audio data corresponding to the sound accompanied by the image displayed on the display device 100.

According to the configuration, the pair of shutter glasses 400 includes the speaker for outputting a sound. Further, the image watching glasses identification device 10 (or 20 or 30) includes an audio control section 14, which supplies, to the speaker of the pair of shutter glasses 400, audio data corresponding to the sound accompanied by the image displayed on the display device 100.

Accordingly, the image watching glasses identification device 10 (or 20 or 30) enables, even in a case where a plurality of viewers are watching respective different images, each of the plurality of viewers to hear a sound accompanied by an image corresponding to a pair of shutter glasses 400 worn by the each of the plurality of viewers. This makes it possible to provide a more user-friendly watching environment to a viewer.

The display device 100 can include any of the foregoing image watching glasses identification devices 100 (or 20 or 30).

According to the configuration, the image watching glasses identification device 10 (or 20 or 30) is included in the display device 100. This achieves an advantageous effect, in which it is possible to achieve an integrated and easily-operable display device 100, thereby improving user-friendliness.

The pair of shutter glasses 400 can further include: a notifying section for obtaining, from the image watching glasses identification device 10 (or 20 or 30), the identification result associated with the identification information item, and then notifying the identification result thus obtained.

The pair of shutter glasses 400 can further include: a notifying section for obtaining, from the display control section 12, an image type information item regarding a type of an available image, and then notifying the type of the available image indicated by the image type information item.

According to these configurations, the notifying section of the pair of shutter glasses 400 notifies the identification result or the type of the available image.

Accordingly, the viewer can identify the pair of shutter glasses 400, or can recognize the type of the available image that can be watched through the pair of shutter glasses 400, by checking the notifying section.

Accordingly, while the viewer is not wearing the pair of shutter glasses 400, the notifying section 420 makes it possible to directly notify the viewer of the identification result without causing the viewer to check the display device 100. While the viewer is wearing the pair of shutter glasses 400, the display device 100 displays the identification result so that the viewer recognizes the identification result from the display. That is, the pair of shutter glasses 400 makes it possible to notify the viewer of the identification result before and after the viewer wears the pair of shutter glasses 400.

Further, since the pair of shutter glasses 400 enables the viewer to check the notifying section before the viewer wears the pair of shutter glasses 400, the viewer can recognize, without checking the display of the display device 100, the type of the available image that can be watched through the pair of shutter glasses 400. This makes it possible to provide a more use-friendly pair of shutter glasses 400 to the viewer.

Note that the image watching glasses identification device 10 (or 20 or 30) can be realized also by a computer. In that case, the present invention encompasses also (i) an image watching glasses identification program for causing the computer to function as various means, thereby the computer realizing the image watching glasses identification device 10 (or 20 or 30) and (ii) a computer-readable recording medium in which the image watching glasses identification program is stored.

The image watching glasses identification device in accordance with the present invention can be configured such that the identification information obtaining means is capable of receiving the identification information item from the pair of image watching glasses.

According to the configuration, it is possible for the identification information obtaining means to easily obtain the identification information item. Specifically, since the identification information obtaining means is capable of receiving the identification information item from the pair of image watching glasses, it is not necessary, for the purpose of obtaining the identification information item, to cause a viewer to input the identification information item via an operation section such as a keyboard. Accordingly, it is possible for the identification information obtaining means to obtain the identification information item quickly and surely.

The communication between the image watching glasses identification device and the pair of image watching glasses can be wireless communication or wired communication. Note however that, since the wired communication causes restrictions on a watching space, movement of viewers, and/or the like, the wireless communication is preferable. The wireless communication, such as for example infrared communication and Bluetooth, does not cause such restrictions.

The image watching glasses identification device in accordance with the present invention can further include command receiving means for receiving a command inputted by a viewer via an operation section, the command being for changing a first setting of the image to be displayed on the display device to a second setting, the command receiving means supplying, to the display controlling means, setting information regarding the second setting, and the display controlling means causing the display device to display the image according to the setting information.

According to the configuration, the command receiving means receives the command for changing the first setting of the image to the second setting, and supplies, to the display controlling means, the setting information regarding the second setting. Then, the display controlling means causes the display device to display the image according to the setting information.

That is, since the image is displayed on the display device according to the setting information, it is possible to achieve an evolutionary method, in which the viewer identifies the pair of image watching glasses worn by the viewer and thus can voluntarily change settings of the image that the pair of image watching glasses corresponds.

The change of the first setting to the second setting of the image can be any change of settings regarding the image. For example, it is possible to change an image to another image (e.g., change an image 1 to an image 2), change image qualities (e.g., change brightness from bright to dark), or the like.

Note that the image watching glasses identification device can be realized also by a computer. In that case, the present invention encompasses also an image watching glasses identification program for causing the computer to function as various means, thereby the realizing the image watching glasses identification device.

The image watching glasses identification device in accordance with the present invention can further include synchronization controlling means for, in a case where the pair of image watching glasses includes a shutter for a right eye and a shutter for a left eye each of which is capable of switching between whether the image displayed on the display device is viewable or unviewable for a viewer, synchronizing (a) a timing at which at least one of the shutter for the right eye and the shutter for the left eye is opened and (b) a timing at which the display controlling means causes the display device to display the identification result.

According to the configuration, the pair of image watching glasses includes the shutter for the right eye and the shutter for the left eye each of which is capable of switching between whether the image displayed on the display device is viewable or unviewable for the viewer.

Further, the image watching glasses identification device includes the synchronization controlling means, which synchronizes (a) the timing at which at least one of the shutter for the right eye and the shutter for the left eye is opened and (b) the timing at which the display controlling means causes the display device to display the identification result.

According to this configuration, the identification result is displayed on the display device at the timing at which at least one of the shutter for the right eye and the shutter for the left eye is opened. This ensures that the viewer recognizes the identification result.

Since the image watching glasses identification device in accordance with the present invention includes the synchronization controlling means, the image watching glasses identification device is capable of causing the viewer to surely recognize the identification result even in a case where the pair of image watching glasses includes the shutter for the right eye and the shutter for the left eye.

Note that the pair of image watching glasses is constituted by for example liquid crystal shutters.

The image watching glasses identification device in accordance with the present invention can further include command receiving means for receiving a command inputted by the viewer via an operation section, the command being for changing a first setting of the image to be displayed on the display device to a second setting, the command receiving means supplying, to the synchronization controlling means, setting information regarding the second setting, and the synchronization controlling means synchronizing, in accordance with the setting information, (i) a timing at which the image is displayed on the display device according to the setting information and (ii) the timing at which at least one of the shutter for the right eye and the shutter for the left eye is opened.

According to the configuration, the command receiving means receives the command for changing the first setting of the image to the second setting, and then supplies, to the display controlling means, the setting information regarding the second setting. Then, the display controlling means causes the display device to display the image according to the setting information. Further, the image watching glasses identification device in accordance with the present invention includes the synchronization controlling means, which synchronizes, in accordance with the setting information regarding the second setting, (i) the timing at which the image is displayed on the display device according to the setting information and (ii) the timing at which at least one of the shutter for the right eye and the shutter for the left eye is opened.

According to this configuration, the image watching glasses identification device in accordance with the present invention is configured such that the image corresponding to the second setting, to which the first setting is changed by the viewer, is displayed on the display device in synchronization with the opening and closing of the shutters for the right and left eyes. Accordingly, it is possible to, even in a case where the pair of image watching glasses includes the shutter for the right eye and the shutter for the left eye, achieve an evolutionary watching method in which the viewer identifies the pair of image watching glasses worn by the viewer and thus can voluntarily change settings of the image that the pair of image watching glasses corresponds.

The image watching glasses identification device in accordance with the present invention can be configured such that: the image displayed on the display device includes an image for a right eye and an image for a left eye, each of which images can be a constituent of a three-dimensional image; and the synchronization controlling means synchronizes (i) a timing at which the image for the right eye is displayed on the display device and (ii) a timing at which the shutter for the right eye is opened and the shutter for the left eye is closed, and synchronizes (a) a timing at which the image for the left eye is displayed on the display device and (b) a timing at which the shutter for the right eye is closed and the shutter for the left eye is opened.

According to the configuration, the image for the right eye and the image for the left eye, each of which images can be the constituent of the three-dimensional image, are displayed on the display device.

Under such circumstances, the synchronization controlling means (i) causes the shutter for the right eye to be opened and the shutter for the left eye is closed while the image for the right eye is displayed on the display device, and (ii) causes the shutter for the right eye to be closed and the shutter for the left eye to be opened while the image for the left eye is displayed on the display device.

The image watching glasses identification device in accordance with the present invention includes the synchronization controlling means. This makes it possible for the viewer, who is wearing the pair of image watching glasses including the shutter for the right eye and the shutter for the left eye, to watch, even in a case where the image displayed on the display device includes the image for the right eye and the image for the left eye each of which images can be a constituent of the three-dimensional image, the images making up the three-dimensional image. Further, it is possible for the viewer to recognize, from the display of the display device, the identification result for identifying the pair of image watching glasses worn by the viewer.

Accordingly, the image watching glasses identification device in accordance with the present invention makes it possible to perform the display operation in such a manner that the images making up the three-dimensional mage are displayed together with the identification result with respect to the viewer, even in a case where the image displayed on the display device includes the image for the right eye and the image for the left eye each of which images can be a constituent of the three-dimensional image.

The image watching glasses identification device in accordance with the present invention can be configured such that, in a case where a number of the identification information item obtained by the identification information obtaining means is two or more, the display controlling means causes the display device to perform the display operation in such a manner that each of identification results associated with the respective two or more identification information items is displayed together with an image to be watched through a pair of image watching glasses corresponding to the identification information item.

According to the configuration, the display controlling means causes the display device to perform the display operation in such a manner that each of the identification results associated with the respective two or more identification information items is displayed together with the image to be watched through the pair of image watching glasses corresponding to the identification information item, even in a case where a plurality of viewers are wearing the respective pairs of image watching glasses.

According to this configuration, each of the plurality of viewers can identify the pair of image watching glasses worn by the each of the plurality of viewers. This makes it possible also to achieve an evolutionary watching method in which each of the plurality of viewers identifies the pair of image watching glasses worn by the each of the plurality of viewers and thus can change settings of the mage that the pair of image watching glasses corresponds.

The image watching glasses identification device in accordance with the present invention can be configured such that, in a case where a number of the identification information item obtained by the identification information obtaining means is two or more, the synchronization controlling means synchronizes, for each of pairs of image watching glasses corresponding to the respective two or more identification information items, (i) the timing at which at least one of the shutter for the right eye and the shutter for the left eye is opened and (ii) the timing at which the display controlling means causes the display device to display the identification result associated with the identification information item.

Even in a case where a plurality of viewers are wearing respective pairs of image watching glasses, the identification information obtaining means is capable of obtaining two or more identification information items corresponding to the respective pairs of image watching glasses. Under such circumstances, the synchronization controlling means synchronizes, for each of the pairs of image watching glasses corresponding to the respective two or more identification information items, (i) the timing at which at least one of the shutter for the right eye and the shutter for the left eye is opened and (ii) the timing at which the display controlling means causes the display device to display the identification result associated with the identification information item.

According to this configuration, the identification result is displayed on the display device at the timing at which at least one of the shutter for the right eye and the shutter for the left eye is opened. Accordingly, each of the plurality of viewers can surely recognize the identification result.

The image watching glasses identification device in accordance with the present invention can further include: in-use information obtaining means for obtaining an in-use information item which indicates that the pair of image watching glasses is in use, the display controlling means causing, upon receipt of the in-use information item obtained by the in-use information obtaining means, the display device to display the image to be watched through the pair of image watching glasses.

According to the configuration, it is not necessary to cause the display device to always display the image watched through the pair of image watching glasses. This is because the display controlling means causes the display device to display the image upon receipt of the in-use information obtained by the glasses in-use information obtaining means.

This achieves an advantage that qualities of images watched through pairs of image watching glasses are improved, because the images are prevented from being unnecessarily displayed. Specifically, assume that (i) the number of the pairs of image watching glasses is four and (ii) four different images are watched through the respective four pairs of image watching glasses. In this case, the display device is supposed to time-divisionally display the four different images corresponding to the respective four pairs of the image watching glasses. However, according to the above configuration, only two of the four different images are time-divisionally displayed on the display device in a case where two of the four pairs of image watching glasses are not in use. That is, the number of images time-divisionally displayed on the display device is reduced from four to two. This makes it possible for each of the plurality of viewers to watch a corresponding image for twice as long a period of time. Accordingly, it is possible to achieve an advantage that an image quality such as brightness, smoothness, or the like of the corresponding image is improved. A change of the number of images time-divisionally displayed affects brightness, of the images, which is perceived by the plurality of viewers. That is, the change of the number of images time-divisionally displayed affects brightness obtained when the images are watched through the image watching glasses. In a case where a viewer wants certain brightness for environmental reasons, the viewer just needs to change luminance of a display. Even in that case, the reduction of the number of the images time-divisionally displayed makes it possible for the viewer to watch a corresponding image with improved smoothness.

The glasses in-use information obtaining means can obtain, from the pair of image watching glasses, the in-use information item via wired communication or wireless communication between the glasses in-use information obtaining means and the pair of image watching glasses. Alternatively, the glasses in-use information obtaining means can obtain the in-use information item through input operation by the viewer via the operation section. Further, the pair of image watching glasses can be configured such that it (i) includes an ON switch or the like and (ii) inputs the in-use information item into the glasses in-use information obtaining means upon pressing of the ON switch. A method of generating the in-use information item is not limited to a particular kind.

The image watching glasses identification device in accordance with the present invention can be configured such that: the pair of image watching glasses includes audio outputting means for outputting a sound, and the image watching glasses identification device can further include: audio controlling means for supplying, to the audio outputting means of the pair of image watching glasses, audio data corresponding to the sound accompanied by the image displayed on the display device.

According to the configuration, the pair of image watching glasses includes the audio outputting means for outputting a sound. Further, the image watching glasses identification device in accordance with the present invention includes audio controlling means, which supplies, to the audio outputting means of the pair of image watching glasses, audio data corresponding to the sound accompanied by the image displayed on the display device.

Accordingly, the image watching glasses identification device in accordance with the present invention enables, even in a case where a plurality of viewers are watching respective different images, each of the plurality of viewers to hear a sound accompanied by an image corresponding to a pair of image watching glasses worn by the each of the plurality of viewers. This makes it possible to provide a more user-friendly watching environment to a viewer.

The display device in accordance with the present invention can include any of the foregoing image watching glasses identification devices.

According to the configuration, the image watching glasses identification device is included in the display device. This achieves an advantageous effect, in which it is possible to achieve an integrated and easily-operable display device, thereby improving user-friendliness.

The image watching glasses in accordance with the present invention can further include: notifying means for obtaining, from the image watching glasses identification device, the identification result associated with the identification information item, and then notifying the identification result thus obtained.

The image watching glasses in accordance with the present invention can further include: notifying means for obtaining, from the display controlling means, an image type information item regarding a type of an available image, and then notifying the type of the available image indicated by the image type information item.

According to these configurations, the notifying means of the pair of image watching glasses is notified of the identification result or the type of the available image.

Accordingly, the viewer can identify the pair of image watching glasses, or can recognize the type of the available image that can be watched through the pair of image watching glasses, by checking the notifying means.

Accordingly, while the viewer is not wearing the pair of image watching glasses, the notifying means makes it possible to directly notify the viewer of the identification result without causing the viewer to check the display device. While the viewer is wearing the pair of image watching glasses, the display device displays the identification result so that the viewer recognizes the identification result from the display. That is, the pair of image watching glasses in accordance with the present invention makes it possible to notify the viewer of the identification result before and after the viewer wears the pair of image watching glasses.

Further, since the pair of image watching glasses in accordance with the present invention enables the viewer to check the notifying means before the viewer wears the pair of image watching glasses, the viewer can recognize, without checking the display of the display device, the type of the available image that can be watched through the pair of image watching glasses. This makes it possible to provide a more use-friendly pair of image watching glasses to the viewer.

The present invention encompasses also an image watching glasses identification program for identifying a pair of image watching glasses through which to watch an image displayed on a display device, the image watching glasses identification program causing a computer to execute the steps of: obtaining an identification information item for identifying the pair of image watching glasses; and causing the display device to display an identification result associated with the identification information item obtained in the step of obtaining.

The present invention encompasses also an image watching glasses identification program for use in an image watching glasses identification device for identifying a pair of image watching glasses through which to watch an image displayed on a display device, the image watching glasses identification device including: identification information obtaining means for obtaining an identification information item for identifying the pair of image watching glasses; and display controlling means for causing the display device to display an identification result associated with the identification information item obtained by the identification information obtaining means, said image watching glasses identification program causing a computer to execute the steps of: receiving a command inputted by a viewer via an operation section, the command being for changing a first setting of the image displayed on the display device to a second setting; supplying setting information to the display controlling means, the setting information regarding the second setting; and causing the display controlling means to cause the display device to display an image corresponding to the setting information.

The present invention encompasses also a computer-readable recording medium, in which any of the foregoing image watching glasses identification programs is stored.

Note that the image watching glasses identification device can be realized also by a computer. In that case, the present invention encompasses also (i) an image watching glasses identification program for causing the computer to function as various means, thereby the computer realizing the image watching glasses identification device and (ii) a computer-readable recording medium in which the image watching glasses identification program is stored.

[Supplementary Descriptions]

The various blocks in the image watching glasses identification device 10 (or 20 or 30), especially the control section 11 (display control section 12, synchronization control section 13, and audio control section 14), the identification information obtaining section 15, the glasses in-use information obtaining section 16, and the command receiving section 17 (communication section 18 and setting change section 19) of the image watching glasses identification device 10 (or 20 or 30) can be implemented by hardware or software executed by a CPU as follows.

Namely, the image watching glasses identification device 10 (or 20 or 30) includes a CPU (central processing unit) and memory devices (storage media). The CPU executes instructions contained in control programs so as to realize various functions. The memory devices may be a ROM (read-only memory) containing programs, a RAM (random access memory) to which the programs are loaded, or a memory containing the programs and various data. An object of the present invention can be achieved also by mounting, to the image watching glasses identification device 10 (or 20 or 30), a computer-readable storage medium containing control program code (executable programs, intermediate code programs, or source programs) for control programs for the image watching glasses identification device 10 (or 20 or 30), which control programs are software implementing the aforementioned functions, in order for a computer (or CPU, MPU) of the image watching glasses identification device 10 (or 20 or 30) to retrieve and execute the program code contained in the storage medium.

The storage medium can be, for example, a tape, such as a magnetic tape or a cassette tape; a magnetic disk, such as a Floppy® disk or a hard disk, or an optical disc, such as a CD-ROM/MO/MD/DVD/CD-R/Blu-ray disc; a card, such as an IC card (memory card) or an optical card; or a semiconductor memory, such as a mask ROM/EPROM/EEPROM/flash ROM.

The image watching glasses identification device 10 (or 20 or 30) can be arranged to be connectable to a communications network so that the program code is delivered over the communications network. The communications network is not limited in any particular manner, and can be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and can be, for example, a wired line, such as IEEE 1394, USB, an electric power line, a cable TV line, a telephone line, or an ADSL; or wireless, such as infrared (IrDA, remote control), Bluetooth®, 802.11 wireless, HDR, a mobile telephone network, a satellite line, or a terrestrial digital network. The present invention encompasses a carrier wave, or data signal transmission, in which the program code is embodied electronically.

The invention is not limited to the description of the embodiments above, but may be altered within the scope of the claims. That is, an embodiment based on a proper combination of technical means altered within the scope of the claims is encompassed in the technical scope of the invention.

INDUSTRIAL APPLICABILITY

The present invention is widely applicable to an image watching glasses identification device, an image watching system, a pair of image watching glasses, an image watching glasses identification program, a computer-readable recording medium, a display device, and the like, each of which is capable of causing, when a viewer watches through the pair of image watching glasses an image displayed on the display device, the display device to display an identification result for identifying the image watching glasses.

REFERENCE SIGNS LIST 1, 2, 3 Image watching system
10, 20, 30 Image watching glasses identification device
11 Control section
12 Display control section (Display controlling means)
13 Synchronization control section (Synchronization controlling means)
14 Audio control section (Audio controlling means)
15 Identification information obtaining section (Identification Information Obtaining Means)
16 Glasses in-use information obtaining section (In-use information obtaining means)
17 Command receiving section (Command receiving means)
18 Communication section
19 Setting change section
100 Display device
200 Storage section
300 Operation section
400, 400A, 400B Shutter glasses
410 Speaker
420 Notifying section (Notifying means)
500 Record reproduction device
600 Transponder

The invention claimed is:

1. A display method for displaying, on a display device, different images to each of a plurality of viewers, each of the plurality of viewers wearing a pair of image watching glasses capable of switching between whether an image displayed on a display device is viewable or unviewable for the viewer wearing the pair of image watching glasses, the display method comprising:

providing the image watching glasses with notifying means for notifying which image or images are viewable through the pair of image watching glasses for the viewer wearing the pair of image watching glasses; and causing the display device to carry out a display on the display device to notify, through the pairs of image watching glasses, each of the viewers of which image or images are viewable through the pair of image watching glasses so that each of the plurality of viewers identify that the pair of glasses they wear is for use to watch the image or images.

* * * * *